United States Patent
Seo et al.

(10) Patent No.: US 9,888,473 B2
(45) Date of Patent: *Feb. 6, 2018

(54) METHOD AND DEVICE FOR COMMUNICATION BETWEEN TERMINALS IN WIRELESS COMMUNICATION SYSTEM

(71) Applicant: LG Electronics Inc., Seoul (KR)

(72) Inventors: Hanbyul Seo, Anyang-si (KR); Daewon Lee, Anyang-si (KR); Mingyu Kim, Anyang-si (KR); Byounghoon Kim, Anyang-si (KR); Kijun Kim, Anyang-si (KR); Youngseob Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,302

(22) Filed: Aug. 31, 2016

(65) Prior Publication Data

US 2017/0006605 A1    Jan. 5, 2017

Related U.S. Application Data

(63) Continuation of application No. 14/919,348, filed on Oct. 21, 2015, now Pat. No. 9,462,585, which is a (Continued)

(51) Int. Cl.
*H04W 4/00* (2009.01)
*H04W 72/04* (2009.01)
(Continued)

(52) U.S. Cl.
CPC ..... *H04W 72/0446* (2013.01); *H04J 11/0069* (2013.01); *H04W 52/04* (2013.01);
(Continued)

(58) Field of Classification Search
None
See application file for complete search history.

(56) References Cited

U.S. PATENT DOCUMENTS 8,140,098 B2   3/2012  Gorokhov
9,185,700 B2  11/2015  Seo et al.
(Continued)

FOREIGN PATENT DOCUMENTS

WO   2010039003 A3    4/2010
WO   2010093202 A3    8/2010
WO   2010122419 A2   10/2010

OTHER PUBLICATIONS

ZTE: "Scenarios and Specification Impact of Type 2 Relay", 3GPP Draft; R1-100979_TYPE2_RN, 3rd Generation Partnership Project (3GPP), Mobile Competence Centre; 650, Route Des Lucioles; F-06921 Sophia-Antipolis Cedex; France, vol. RAN WG1, no. San Francisco, USA; Feb. 22, 2010, Feb. 17, 2010 (Feb. 17, 2010), XP050418973.

*Primary Examiner* — Phirin Sam
(74) *Attorney, Agent, or Firm* — Dentons US LLP

(57) ABSTRACT

The present invention relates to a wireless communication system, and more particularly, to a method and device for communication between terminals in a wireless communication system. According to the present invention, a resource configuration method, a channel configuration method, a transmission power control method, etc. for communication between terminals can be provided.

10 Claims, 23 Drawing Sheets

Related U.S. Application Data continuation of application No. 13/988,708, filed as application No. PCT/KR2011/009421 on Dec. 7, 2011, now Pat. No. 9,185,700.

(60) Provisional application No. 61/492,354, filed on Jun. 1, 2011, provisional application No. 61/490,601, filed on May 27, 2011, provisional application No. 61/475,644, filed on Apr. 14, 2011, provisional application No. 61/451,077, filed on Mar. 9, 2011, provisional application No. 61/427,097, filed on Dec. 23, 2010, provisional application No. 61/420,322, filed on Dec. 7, 2010.

(51) Int. Cl.
  *H04J 11/00* (2006.01)
  *H04W 52/04* (2009.01)
  *H04W 88/02* (2009.01)
  *H04W 88/08* (2009.01)
  *H04W 88/04* (2009.01)

(52) U.S. Cl.
  CPC ..... *H04W 72/042* (2013.01); *H04W 72/0406* (2013.01); *H04W 88/02* (2013.01); *H04W 88/04* (2013.01); *H04W 88/08* (2013.01)

(56) References Cited

U.S. PATENT DOCUMENTS

| | | | |
|---|---|---|---|
| 9,462,585 B2* | 10/2016 | Seo | H04J 11/0069 |
| 2009/0016295 A1 | 1/2009 | Li et al. | |
| 2010/0093364 A1* | 4/2010 | Ribeiro | H04W 72/082 |
| | | | 455/452.2 |
| 2010/0167743 A1 | 7/2010 | Palanki et al. | |
| 2010/0220668 A1* | 9/2010 | Yamada | H04L 5/0007 |
| | | | 370/329 |
| 2010/0227569 A1* | 9/2010 | Bala | H04L 5/0007 |
| | | | 455/73 |
| 2010/0254281 A1 | 10/2010 | Kim et al. | |
| 2010/0260093 A1 | 10/2010 | Liu et al. | |
| 2010/0265874 A1 | 10/2010 | Palanki | |
| 2011/0007779 A1 | 1/2011 | Nanri | |
| 2011/0038271 A1* | 2/2011 | Shin | H04W 52/146 |
| | | | 370/252 |
| 2011/0081939 A1* | 4/2011 | Damnjanovic | H04W 52/08 |
| | | | 455/522 |
| 2011/0106952 A1 | 5/2011 | Doppler et al. | |
| 2011/0216711 A1 | 9/2011 | Onodera | |
| 2011/0237283 A1* | 9/2011 | Shan | H04L 5/0091 |
| | | | 455/509 |
| 2011/0250918 A1* | 10/2011 | Jen | H04W 52/08 |
| | | | 455/509 |
| 2011/0305185 A1 | 12/2011 | Kwon et al. | |
| 2012/0008591 A1 | 1/2012 | Miki | |
| 2012/0044878 A1 | 2/2012 | Ratasuk | |
| 2012/0087333 A1 | 4/2012 | Huang | |
| 2012/0117155 A1 | 5/2012 | Li et al. | |
| 2012/0122440 A1 | 5/2012 | Krishnamurthy | |
| 2012/0122472 A1 | 5/2012 | Krishnamurthy | |
| 2012/0129540 A1 | 5/2012 | Hakola et al. | |
| 2012/0134344 A1 | 5/2012 | Yu et al. | |
| 2012/0327889 A1 | 12/2012 | Sayeedi | |
| 2014/0254521 A1 | 9/2014 | Fong | |
| 2014/0321395 A1 | 10/2014 | Baldemair | |
| 2015/0304017 A1* | 10/2015 | Zhuang | H04B 7/15507 |
| | | | 370/315 |
| 2016/0248545 A1* | 8/2016 | Cheng | H03M 13/136 |

* cited by examiner

FIG. 6
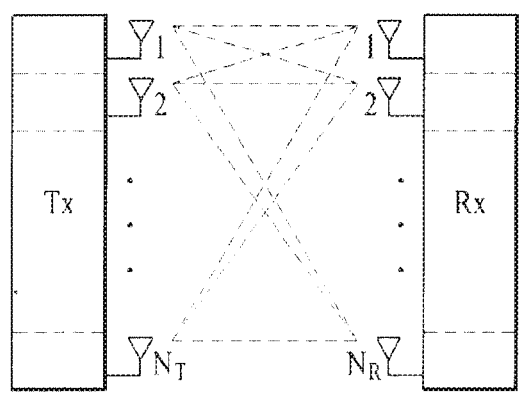
(a)
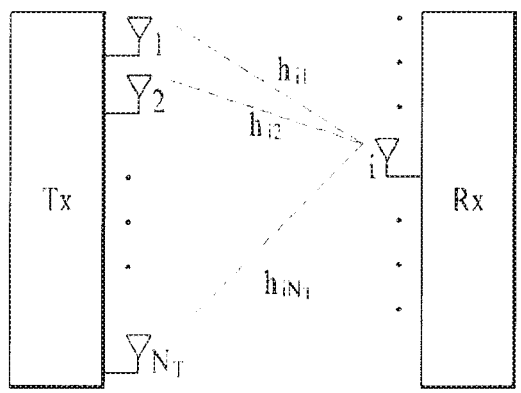
(b)

FIG. 7
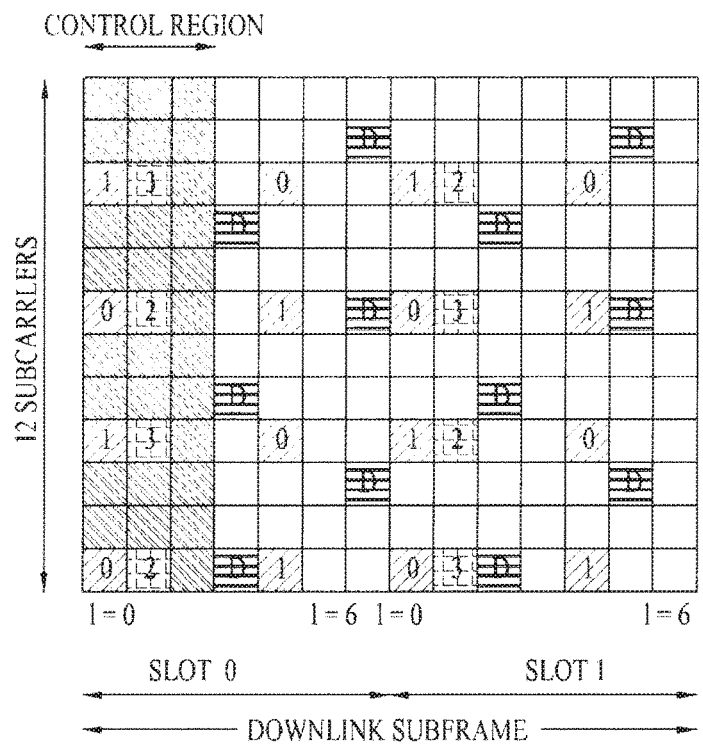
(a)
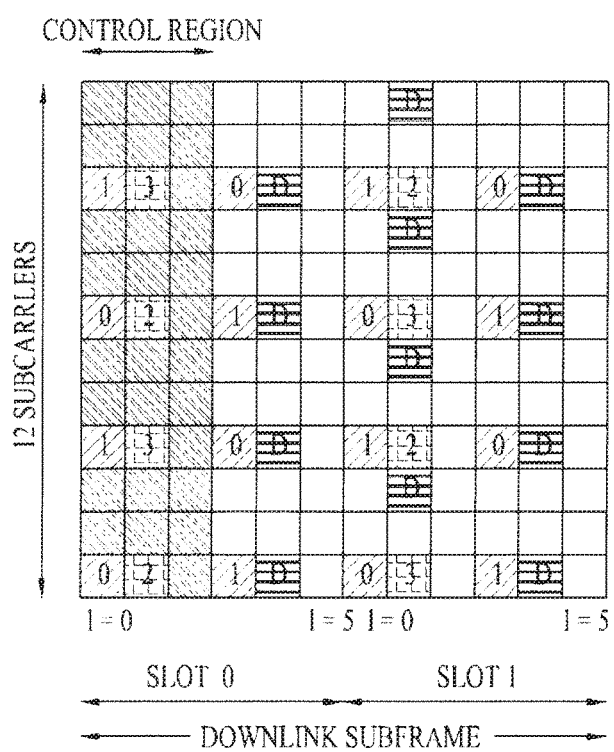
(b)

FIG. 13
(a) 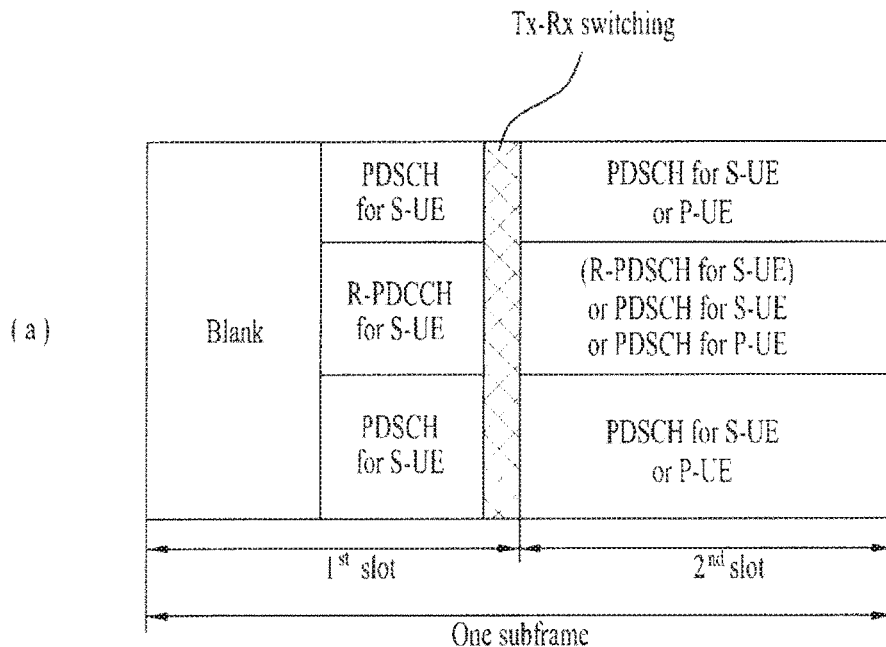
(b) 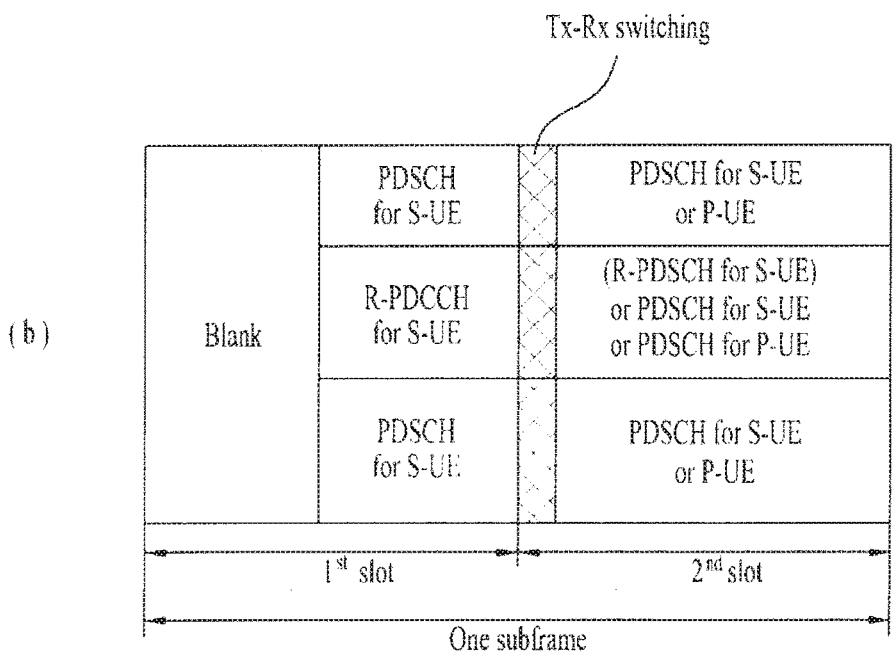

FIG. 14
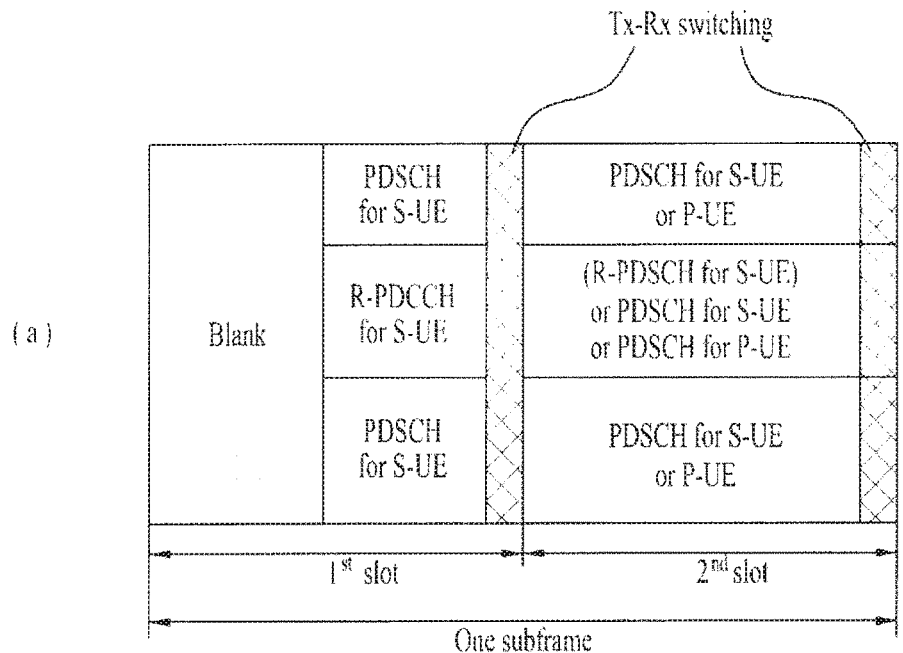
(a)
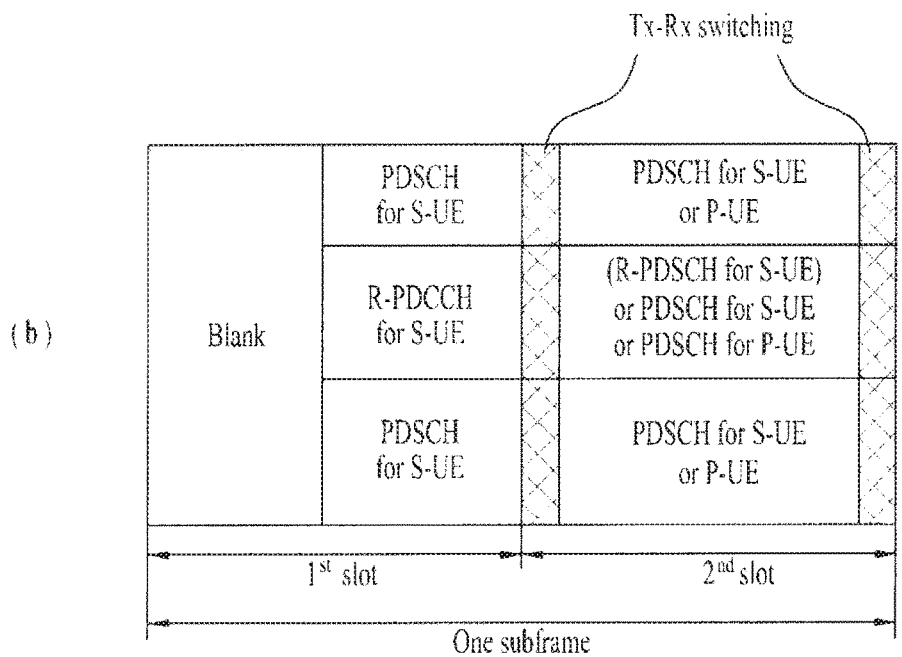
(b)

FIG. 15
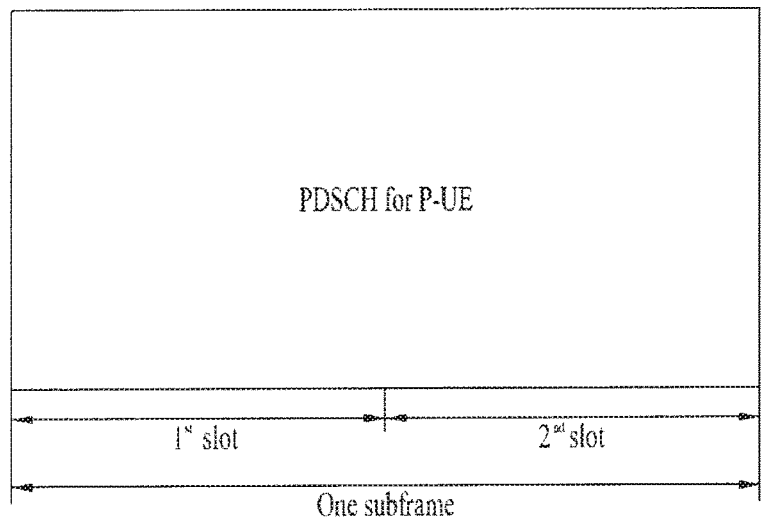
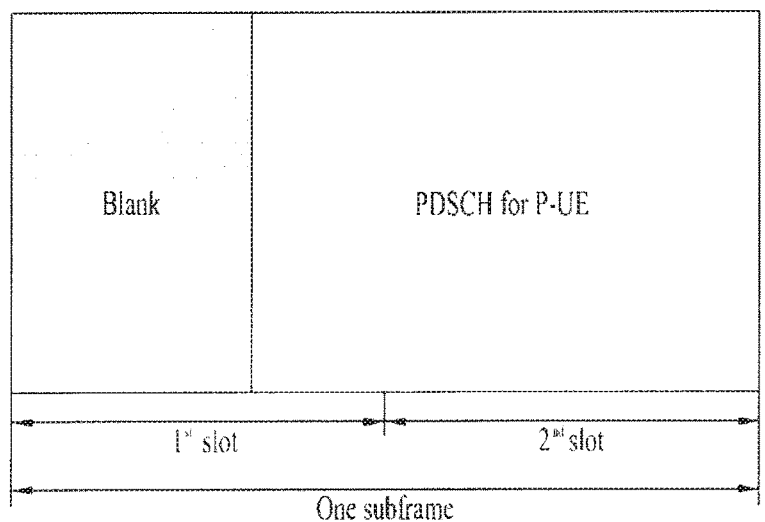

FIG. 16
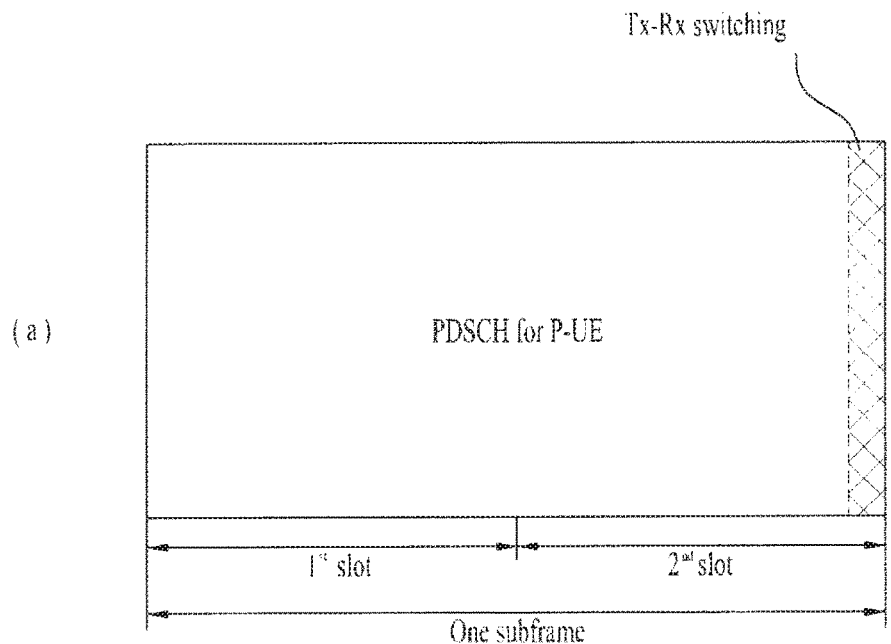
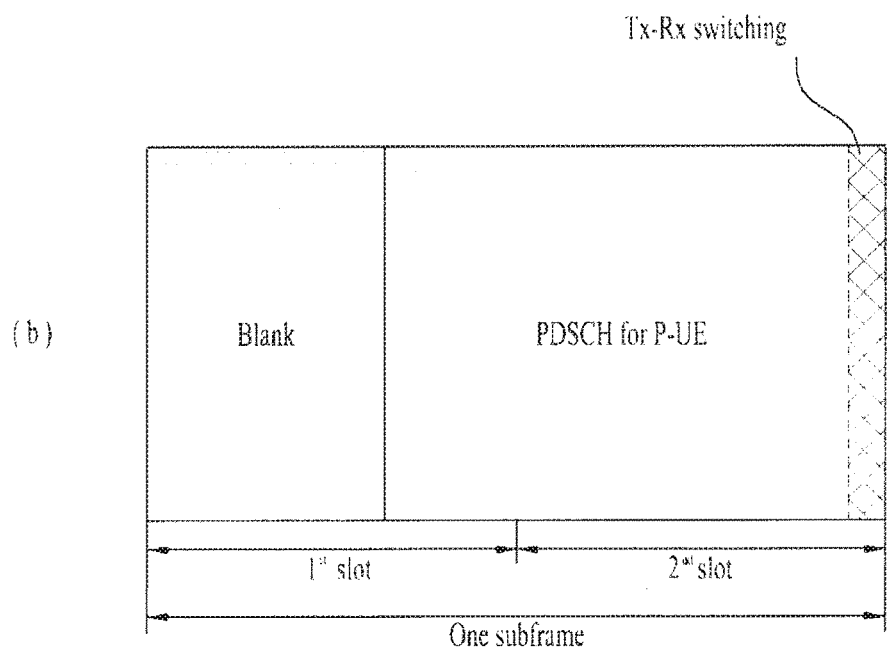

METHOD AND DEVICE FOR COMMUNICATION BETWEEN TERMINALS IN WIRELESS COMMUNICATION SYSTEM

This application is a Continuation of U.S. patent application Ser. No. 14/919,348, filed on Oct. 21, 2015, now issued as U.S. Pat. No. 9,185,700, which is a Continuation of U.S. patent application Ser. No. 13/998,708, filed on Jul. 15, 2013, which is a 35 U.S.C. § 371 National Stage Entry of International Application No. PCT/KR2011/009421 filed Dec. 7, 2011 and claims the benefit of U.S. Provisional Application Nos. 61/420,322 filed Dec. 7, 2010; 61/427,097 filed Dec. 23, 2010; 61/451,077 filed Mar. 9, 2011; 61/475,644 filed Apr. 14, 2011; 61/490,601 filed May 27, 2011 and 61/492,354 filed Jun. 1, 2011, all of which are incorporated by reference in their entirety herein.

TECHNICAL FIELD

The present invention relates to a wireless communication system and, more particularly, to a method and device for communication between terminals in a wireless communication system.

BACKGROUND ART

FIG. 1 is a diagram showing an example of a wireless communication system to which the present invention is applicable. FIG. 1 shows two kinds of user equipments (UEs): a primary UE directly connected to a base station (e.g., an eNB) 110 to exchange a signal with a network and a secondary UE for exchanging a signal with a network via the primary UE. FIG. 1 shows a primary UE1 120 and a primary UE2 130 as an example of a primary UE and a secondary UE1 140 and a secondary UE2 150 as an example of a secondary UE. The secondary UE1 140 and the secondary UE2 150 may communicate with the primary UE1 120. The primary UE and the secondary UE may be referred to as a master UE and a slave UE, respectively. For example, the primary UE1 120 may serve to relay a signal transmitted by the secondary UE1 140 and/or a signal transmitted to the secondary UE1 140 between the secondary UE1 140 and the eNB 110. If one UE serves as a relay for another UE, a UE-relay scheme may be applied. FIG. 1 shows operation for exchanging a signal between the primary UE1 120 and the secondary UE 140 and/or 150 within coverage of the eNB 110.

One or more secondary UEs may be connected to one primary UE and the primary UE may serve to control transmission/reception operations of a plurality of secondary UEs connected thereto. The primary UE may be, for example, a general mobile telephone and the secondary UE may be a low-power communication device attached to a laptop computer, a music player or a bio signal sensor. For example, the primary UE and the secondary UE may be possessed by the same user.

DISCLOSURE

Technical Problem

It is necessary to prevent (or minimize) interference from occurring in communication of other UEs due to communication between a primary UE and a secondary UE. In the example of FIG. 1, communication between another UE (e.g., the primary UE2 130) and the eNB 110 has higher priority than communication between the primary U1 120 and the secondary UE1 140. This is because communication between a UE and an eNB according a previously defined scheme is designed without considering communication between a primary UE and a secondary UE and thus communication between the primary UE and the secondary UE must be defined so as not to obstruct communication between the other UE and the eNB. For example, communication between the primary UE1 120 and the secondary UE1 140 is preferably performed only when there is no real-time traffic communication between the primary UE2 130 and the eNB 110.

In addition, communication between the primary UE and the secondary UE need to avoid interference occurring in communication between other UEs. For example, in a communication environment shown in FIG. 1, assume that the primary UE1 120 and the secondary UE1 140 are located close to each other (e.g., the same user has the primary UE1 120 and the secondary UE1 140). Accordingly, the primary UE and the secondary UE may generally perform communication with low power, because it is possible to reduce battery power consumption of the primary UE and the secondary UE. Meanwhile, the other UE (e.g., the primary UE2 130) and the eNB 110 may perform communication with relatively high power. Accordingly, since communication between the other UE and the eNB provides strong interference to communication between the primary UE and the secondary UE, it is necessary to provide a means for avoiding strong interference.

An object of the present invention devised to solve the problem lies in a method of transmitting/receiving a signal between UEs. Another object of the present invention devised to solve the problem lies on a resource configuration method, a channel configuration method, a transmit power control method, etc. for communication between UEs. Another object of the present invention devised to solve the problem lies in a method for communication between UEs and between a UE and a base station in a licensed/unlicensed band.

The technical problems solved by the present invention are not limited to the above technical problems and other technical problems which are not described herein will become apparent to those skilled in the art from the following description.

Technical Solution

The object of the present invention can be achieved by providing a method of performing communication between a first user equipment (UE) and a second UE in a wireless communication system including, at the first UE, receiving scheduling information including information about allocation of resources for communication between the UEs from a base station, and performing communication between the first UE and the second UE based on the scheduling information, wherein a first slot of a subframe among the resources for communication between the UEs includes a control signal for communication between the UEs and a second slot of the subframe includes a data signal between the UEs.

In another aspect of the present invention, provided herein is a user equipment (UE) for performing communication between UEs, the UE being a first UE for performing communication with a second UE in a wireless communication system, including a transmission module for transmitting a signal to an external device, a reception module for receiving a signal from an external device, and a processor for controlling the first UE, including the reception module and the transmission module, wherein the processor is configured to receive scheduling information including information about allocation of resources for communication between the UEs from a base station and to perform communication with the second UE based on the scheduling information, wherein a first slot of a subframe among the resources for communication between UEs includes a control signal for communication between the UEs and a second slot of the subframe includes a data signal between the UEs.

The embodiments of the present invention may include the following features.

If the resources for communication between the UEs among uplink resources from the first UE to the base station are allocated, the first slot may be used to transmit a control signal for the second UE and the second slot may be used for transmission/reception between the first and second UEs.

If resources for communication between the UEs among downlink resources from the base station to the first UE are allocated, resources for communication between the UEs may be allocated to symbols other than the first one or more symbols of the subframe and a control signal for the second UE may be additionally transmitted on the second slot.

The first one or more symbols of the subframe may be allocated for carrier sensing.

A last symbol of the first slot of the subframe may be set to a null symbol for transmission-reception switching.

A last symbol of the second slot of the subframe may be set to a null symbol for transmission-reception switching or transmit power change.

The scheduling information may be provided to the first and second UEs using one scheduling message associated with an identifier assigned to a pair of the first UE and the second UE.

The scheduling information may be provided to each of the first and second UEs using a separate scheduling message associated with an identifier assigned to each of the first and second UEs.

The second UE may receive a scheduling message associated with an identifier of the first UE.

The scheduling information may be transmitted from the base station to the first UE via a random access procedure of the first UE.

The scheduling information may separately include a transmit power control command for transmission from the first UE to the base station and a transmit power control command for transmission from the first UE to the second UE.

If the second UE reports receive power of a signal from the first UE to the base station, the transmit power of the signal from the first UE may have a fixed value previously specified via high layer signaling or a value indicated by the base station as an absolute value.

The first UE may periodically or aperiodically report transmit power of the signal from the first UE to the base station.

It is to be understood that both the foregoing general description and the following detailed description of the present invention are exemplary and explanatory and are intended to provide further explanation of the invention as claimed.

Advantageous Effects

According to the present invention, it is possible to provide a method of transmitting/receiving a signal between UEs. In addition, it is possible to provide a resource configuration method, a channel configuration method, a transmit power control method, etc. for communication between UEs. In addition, it is possible to provide a method for communication between UEs and between a UE and a base station in a licensed/unlicensed band.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 6 is a diagram showing the configuration of a wireless communication system having multiple antennas.

FIG. 7 is a diagram showing CRS and DRS patterns defined in the existing 3GPP LTE system.

FIG. 13 is a diagram showing a region in which Tx-Rx switching is performed in a subframe structure according to an example of the present invention.

FIG. 14 is a diagram illustrating usage of a last portion of a subframe in the subframe structure of FIG. 13 according to an example of the present invention.

FIG. 15 is a diagram showing a subframe structure using both first and second slots for transmission of a secondary UE according to an example of the present invention.

FIG. 16 is a diagram illustrating usage of a last portion of a subframe in the subframe structure of FIG. 15 according to an example of the present invention.

BEST MODE

Figure 1:
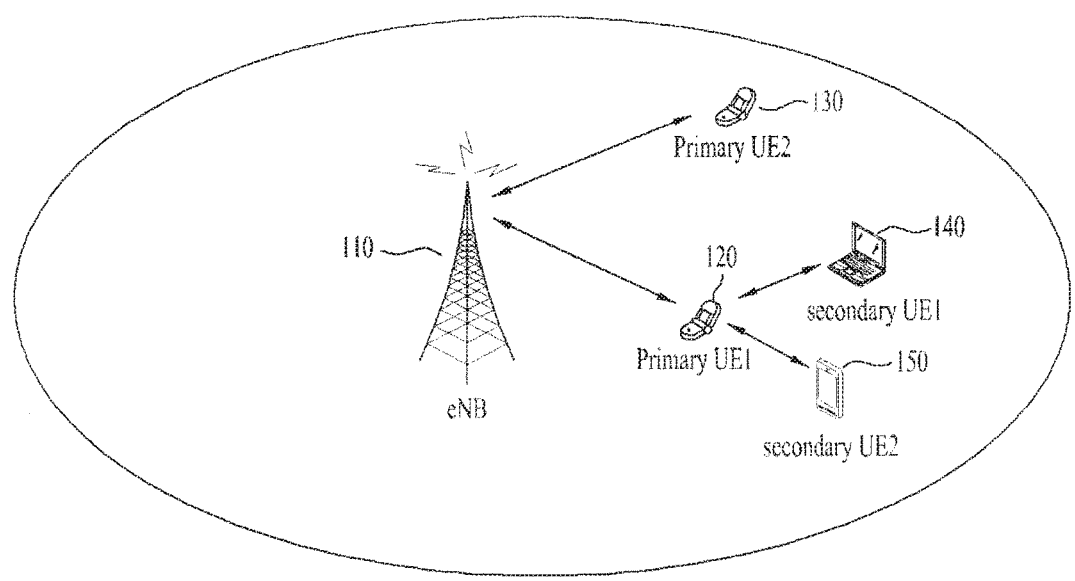
FIG. 1 is a diagram showing an example of a wireless communication system to which the present invention is applicable.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between abuse station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with radio technology such as UTRA (Universal Terrestrial Radio Access) or CDMA2000. The TDMA may be embodied with radio technology such as GSM (Global System for Mobile communications)/GPRS (General Packet Radio Service)/EDGE (Enhanced Data Rates for GSM Evolution). The OFDMA may be embodied with radio technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE, WiMAX can be explained by an IEEE 802.16e (WirelessMA-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

Figure 2:
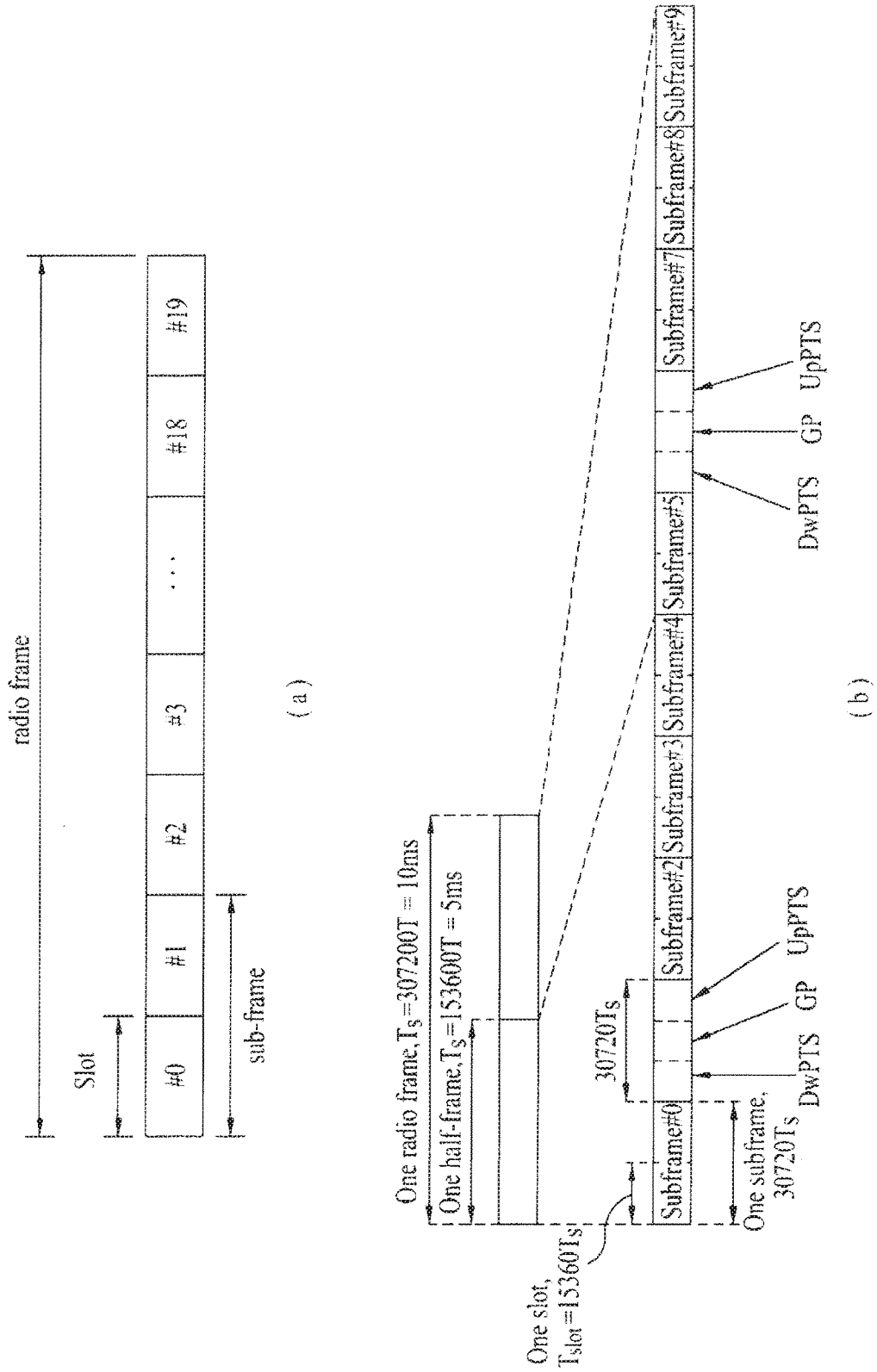
FIG. 2 is a diagram showing the structure of a downlink radio frame.

The structure of a downlink radio frame will be described with reference to FIG. 2.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 2(a) is a diagram showing the structure of the type 1 radio frame. A downlink radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, and thus the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

FIG. 2(b) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation of a base station and uplink transmission synchronization of the user equipment. The guard period is to remove interference occurring in an uplink due to multi-path delay of a downlink signal between the uplink and a downlink. Meanwhile, one subframe includes two slots regardless of a type of the radio frame.

The structure of the radio frame is only exemplary. Accordingly, the number of subframes included in the radio frame, the number of slots included in the subframe or the number of symbols included in the slot may be changed in various manners.

Figure 3:
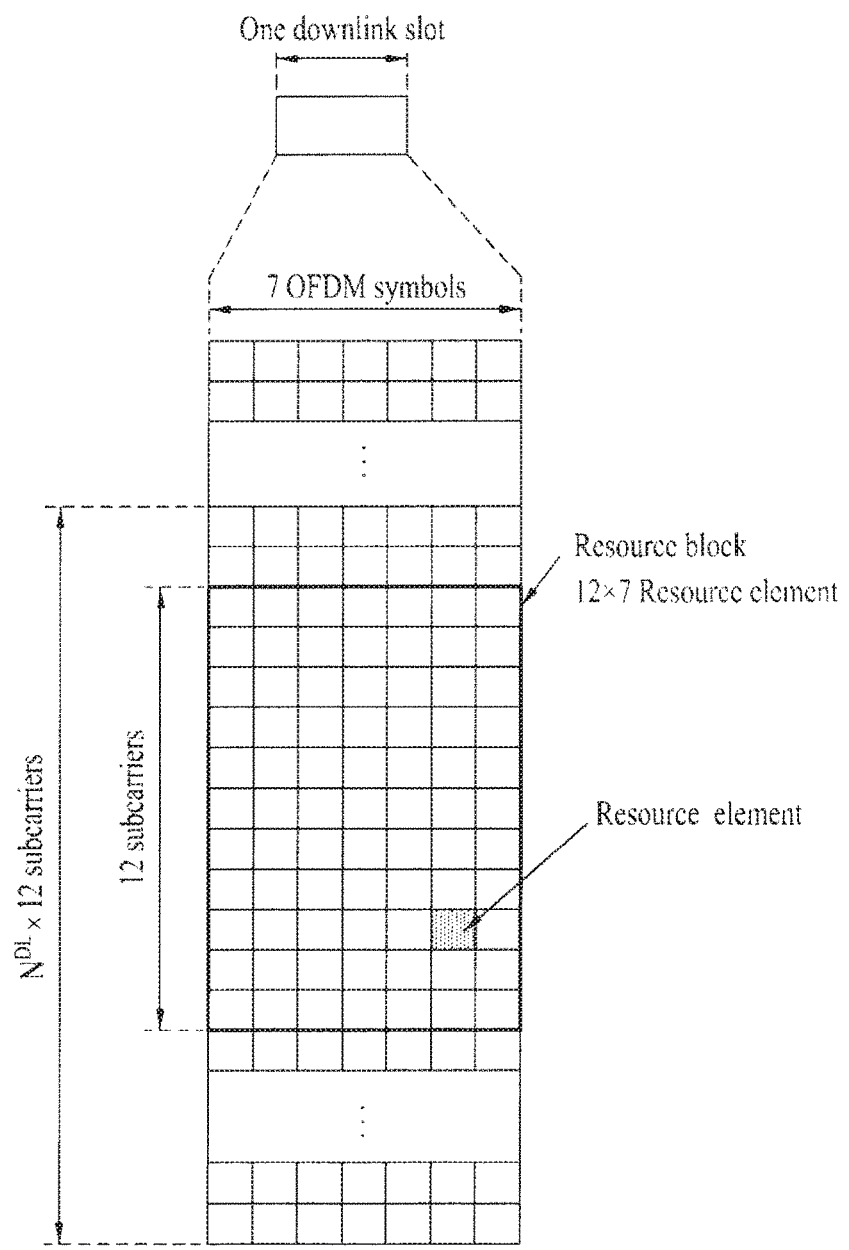
FIG. 3 is a diagram showing a resource grid of a downlink slot.

FIG. 3 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number $N^{DL}$ of RBs included in the downlink slot is determined based on a downlink transmission bandwidth. The structure of the uplink slot may be equal to the structure of the downlink slot.

Figure 4:
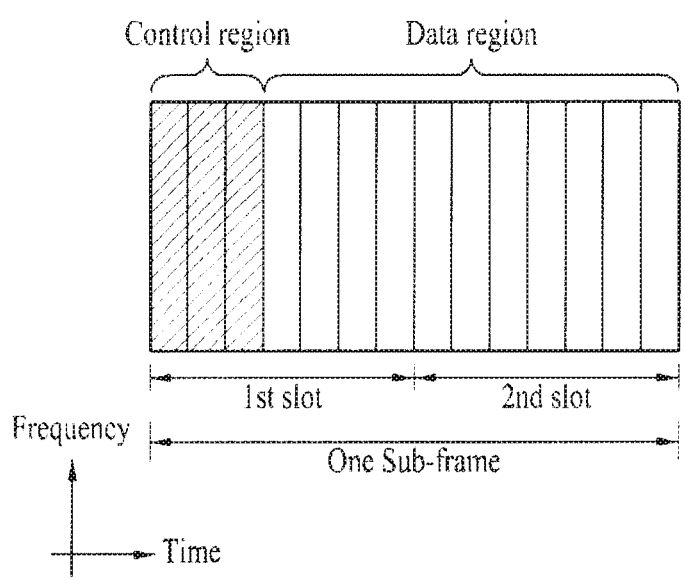
FIG. 4 is a diagram showing the structure of a downlink subframe.

FIG. 4 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (MUCH), etc. The PCFICH is transmitted at a first OFDM symbol of a sub-frame, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCI), resource allocation information of an Uplink Shared Channel (UL-SCI), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
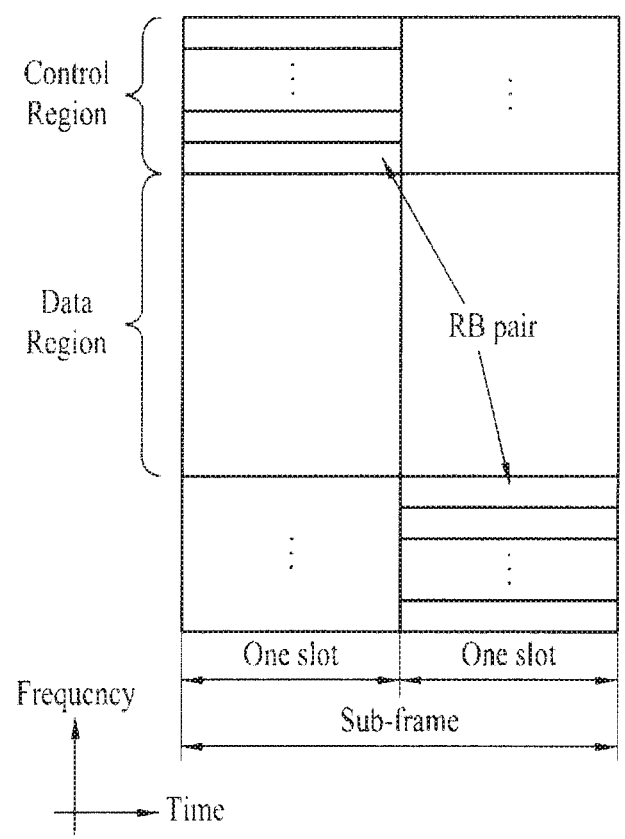
FIG. 5 is a diagram showing the structure of an uplink subframe.

FIG. 5 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

FIG. 6 is a diagram showing the configuration of a wireless communication system having multiple antennas.

As shown in FIG. 6(a), if the number of transmission antennas is increased to $N_T$ and the number of reception antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_O$ upon using a single antenna and a rate increase ratio $R_i$.

$$R_i = \min(N_T, N_R) \qquad \text{Equation 1}$$

For example, in an MIMO system using four transmission antennas and four reception antennas, it is possible to theoretically acquire a transfer rate which is four times that of a single antenna system. After the increase in the theoretical capacity of the MIMO system was proved in the mid-1990s, various technologies of substantially improving a data transfer rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

$$s = [s_1, s_2, \ldots, s_{N_T}]^T \qquad \text{Equation 2}$$

The transmitted info $s_1, s_2, \ldots, s_{N_T}$ may have different transmit powers. If the respective transmit powers are $P_1, P_2, \ldots, P_{N_T}$, the transmitted information with adjusted powers may be expressed as follows.

$$\hat{s} = [\hat{s}_1, \hat{s}_2, \ldots, \hat{s}_{N_T}]^T = [P_1 s_1, P_2 s_2, P_{N_T} s_{N_T}]^T \qquad \text{Equation 3}$$

In addition, $\hat{s}$ may be expressed using a diagonal a ix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{Equation 4}$$

Consider that the $N_T$ actually transmitted signals $x_1, x_2, \ldots, x_{N_T}$ are configured by applying a weight matrix W to the information vector $\hat{s}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{Equation 5}$$

where, $w_{ij}$ denotes a weight between an i-th transmission antenna and j-th information. W is also called a precoding matrix.

In received signals, if the $N_R$ reception antennas are present, respective received signals $y_1, y_2, \ldots, y_{N_R}$ of the antennas are expressed as follows.

$$y = [y_1, y_2, \ldots, y_{N_R}]^T \qquad \text{Equation 6}$$

If channels are modeled in the MIMO wireless communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

FIG. 6(b) is a diagram showing channels from the $N_T$ transmission antennas to the reception antenna i. The channels may be combined and expressed in the form of a vector and a matrix. In FIG. 6(b), the channels from the $N_T$ transmission antennas to the reception antenna i may be expressed as follows.

$$h_i^T = [h_{i1}, h_{i2}, \ldots, h_{iN_T}] \qquad \text{Equation 7}$$

Accordingly, all the channels from the $N_T$ transmission antennas to the $N_R$ reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \qquad \text{Equation 8}$$

An Additive White Gaussian Noise (AWGN) is added to the actual channels after a channel matrix H. The AWGN $n_1, n_2, \ldots, n_{N_N}$ added to the $N_T$ transmission antennas may be expressed as follows.

$$n = [n_1, n_2, \ldots, n_{N_R}]^T \qquad \text{Equation 9}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_i \\ \vdots \\ x_{N_R} \end{bmatrix} + \begin{bmatrix} n_1 \\ n_2 \\ \vdots \\ n_i \\ \vdots \\ n_{N_R} \end{bmatrix} = Hx + n \qquad \text{Equation 10}$$

The number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H is an $N_R \times N_T$ matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min^*(N_T, N_R) \qquad \text{Equation 11}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific UE. It is possible to provide information for channel estimation and demodulation using such RSs.

The reception side (UE) estimates the channel state from the CRS and feeds an indicator associated with channel quality, such as a Channel Quality indicator (CQI), a Precoding Matrix Index (PMI) and/or a Rank Indicator (RI), back to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DRS).

FIG. 7 is a diagram showing a pattern of CRSs and DRSs mapped on a downlink RB pair defined in the existing 3GPP LTE system (e.g., Release-8). The downlink RB as a mapping unit of the RSs may be expressed in units of one subframe on a time domain×12 subcarriers on a frequency domain. That is, on the time axis, one RB has a length of 14 OFDM symbols in case of the normal CP (FIG. 7(a)) and has a length of 12 OFDM symbols in case of the extended CP (FIG. 7(b)).

FIG. 7 shows the locations of the RSs on the RB pair in the system in which the eNodeB supports four transmission antennas. In FIG. 7, Resource Elements (REs) denoted by "0", "1", "2" and "3" indicate the locations of the CRSs of the antenna port indexes 0, 1, 2 and 3, respectively. In FIG. 7, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing, (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

$$k = 6m + (v + v_{shift}) \bmod 6 \qquad \text{Equation 12}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$
$$m' = m + N_{RB}^{max,DL} - N_{RB}^{DL}$$

$$v = \begin{cases} 0 & \text{if } p = 0 \text{ and } l = 0 \\ 3 & \text{if } p - 0 \text{ and } l \neq 0 \\ 3 & \text{if } p = 1 \text{ and } l = 0 \\ 0 & \text{if } p - 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k denotes a subcarrier index, l denotes a symbol in and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

More specifically, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, in an LTE-A (Advanced) system which is an evolution version of the 3GPP LTE system, separate RSs (CSI-RSs) for measuring the CSI for the new antenna ports may be used.

Hereinafter, the DRS will be described in detail.

The DRS (or UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

$$k = (k') \bmod N_{sc}^{RB} + N_{sc}^{RB} \cdot n_{PRB} \qquad \text{Equation 13}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \qquad \text{Equation 14}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k denotes a subcarrier index, l denotes a symbol index, and p denotes an antenna port. $N_{SC}^{RB}$ denotes the resource block size in the frequency domain and is expressed by the number of subcarriers. $N_{PRB}$ denotes a physical resource block number. $N_{RB}^{PDSCH}$ denotes the bandwidth of the RB of the PDSCH transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

In the LTE-A system which is the evolution version of the 3GPP LTE system, high-order MIMO, multi-cell transmission, evolved MU-MIMO or the like is considered. In order to support efficient RS management and a developed transmission scheme, DRS-based data demodulation is considered. That is, separately from the DRS (antenna port index 5) for Rank 1 beamforming defined in the existing 3GPP LTE Release-8) system, DRSs for two or more layers may be defined in order to support data transmission through the added antenna.

Cooperative Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding RS (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "SrsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

Figure 8:
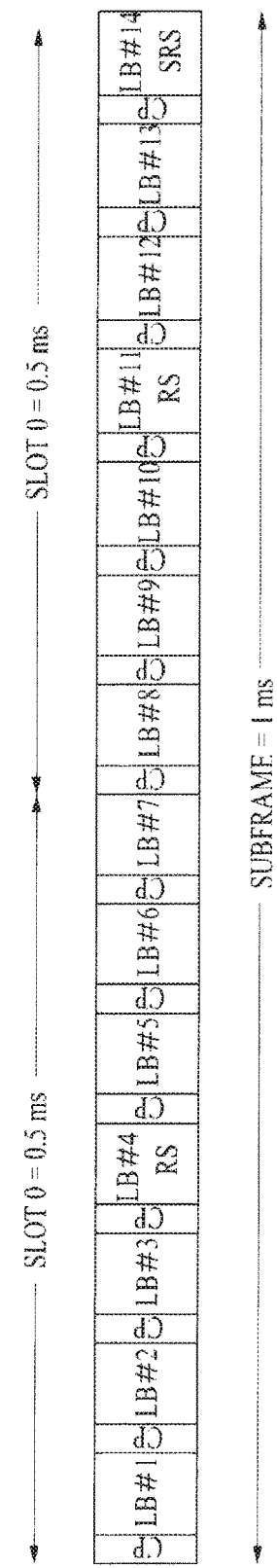
FIG. 8 is a diagram showing an uplink subframe structure including an SRS symbol.

As shown in FIG. 8, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when the sounding overhead is highest (that is, even when SRS transmission symbols are present in all subframes).

Each SRS symbol is generated by the basic sequence (random sequence or Zadoff-Ch (ZC)-based sequence set) with respect to a given time unit and frequency hand, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay Node (RN)

A RN may be considered for, for example, enlargement of high data rate coverage, improvement of group mobility, temporary network deployment, improvement of cell edge throughput and/or provision of network coverage to a new area.

A RN forwards data transmitted or received between the eNodeB and the UE, two different links (backhaul link and access link) are applied to the respective carrier frequency bands having different attributes. The eNodeB may include a donor cell. The RN is wirelessly connected to a radio access network through the donor cell.

The backhaul link between the eNodeB and the RN may be represented by a backhaul downlink if downlink frequency bands or downlink subframe resources are used, and may be represented by a backhaul uplink if uplink frequency bands or uplink subframe resources are used. Here, the frequency band is resource allocated in a Frequency Division Duplex (FDD) mode and the subframe is resource allocated in a Time Division Duplex (TDD) mode. Similarly, the access link between the RN and the UE(s) may be represented by an access downlink if downlink frequency bands or downlink subframe resources are used, and may be represented by an access uplink if uplink frequency bands or uplink subframe resources are used.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

Figure 9:
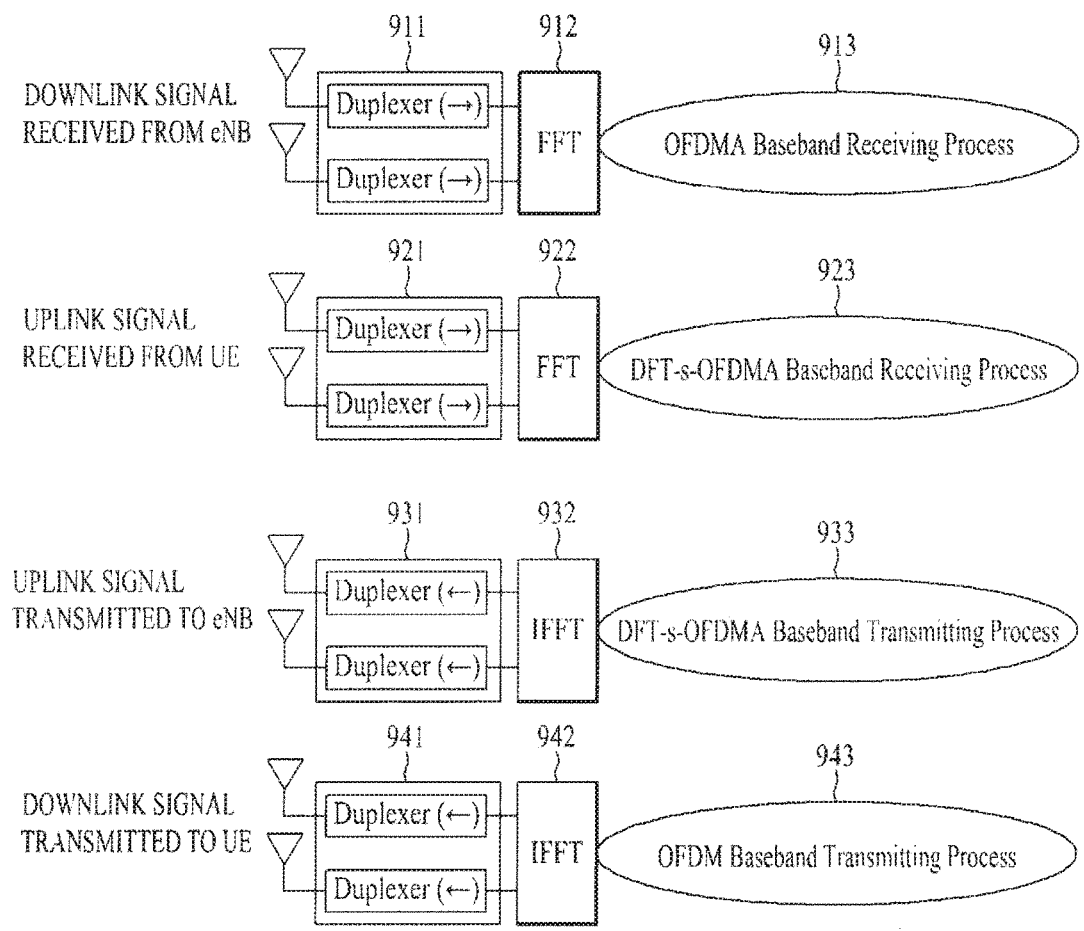
FIG. 9 is a diagram showing an example of implementing a transmission and reception function of an FDD mode relay.

FIG. 9 is a diagram showing an example of implementing transmission and reception functions of a FDD-mode RN. The reception function of the RN will now be conceptually described. A downlink signal received from the eNodeB is forwarded to a Fast Fourier Transform (FFT) module 912 through a duplexer 911 and is subjected to an OFDMA baseband reception process 913. An uplink signal received from the UE is forwarded to a FFT module 922 through a duplexer 921 and is subjected to a Discrete Fourier Transform-spread-OFDMA (DFT-s-OFDMA) baseband reception process 923. The process of receiving the downlink signal from the eNodeB and the process of receiving the uplink signal from the UE may be simultaneously performed. The transmission function of the RN will now be described. The uplink signal transmitted to the eNodeB is transmitted through a DFT-s-OFDMA baseband transmission process 933, an Inverse EFT (WET) module 932 and a duplexer 931. The downlink signal transmitted to the UE is transmitted through an OFDM baseband transmission process 943, an IFFT module 942 and a duplexer 941. The process of transmitting the uplink signal to the eNodeB and the process of transmitting the downlink signal to the UE may be simultaneously performed. In addition, the duplexers shown as functioning in one direction may be implemented by one bidirectional duplexer. For example, the duplexer 911 and the duplexer 931 may be implemented by one bidirectional duplexer and the duplexer 921 and the duplexer 941 may be implemented by one bidirectional duplexer. The bidirectional duplexer may branch into the WET module associated with the transmission and reception on a specific carrier frequency band and the baseband process module line.

In association with the use of the hand (or the spectrum) of the RN, the case where the backhaul link operates in the same frequency band as the access link is referred to as "in-band" and the case where the backhaul link and the access link operate in different frequency bands is referred to as "out band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UP may directly receive scheduling information and HARQ feedback from the RN and transmit its control channel (Scheduling Request (SR), CQI, ACK/NACK, etc.) to the RN. In addition, a legacy UP (a LE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an LI (first layer) operation.

The Type-2 relay is an in-band relay and does not have a separate physical cell ID. Thus, a new cell is not established. The Type-2 relay is transparent to the legacy UE and the legacy UTE does not recognize the presence of the Type-2 relay. The Type-2 relay can transmit a PDSCH, but does not transmit at least a CRS and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated from each other (for example, on the ground or under the ground) in terms of geographical positions).

Figure 10:
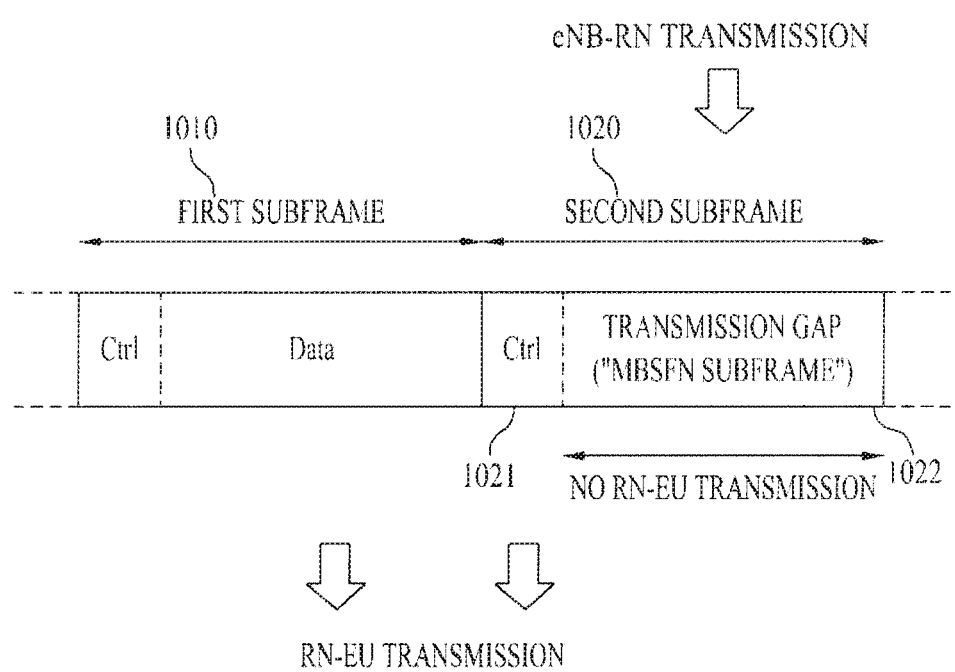
FIG. 10 is a diagram illustrating transmission from a relay to a UE and downlink transmission from a base station to a relay.

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed during such a gap. In FIG. 10, a first subframe 1010 is a general subframe, in which a downlink (that is, access downlink) control signal and data is transmitted from the RN to the UE, and a second subframe 1020 is an Multicast Broadcast Single Frequency Network (MBSFN) subframe, in which a control signal is transmitted from the RN to the UE in a control region 1021 of the downlink subframe, but any signal is not transmitted from the RN to the UE in the remaining region 1022 of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe 1020)) set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region 1021 of the second subframe, it is possible to provide backward compatibility to the legacy UE served by the RN. While any signal is not transmitted from the RN to the UE in the remaining region 1022 of the second subframe, the RN may receive the signal transmitted from the eNodeB. Accordingly, the resource partitioning disables the in-band RN to simultaneously perform the access downlink transmission and the backhaul downlink reception.

The second subframe 1022 using the MBSFN subframe will now be described in detail. The MBSFN subframe is for a multimedia broadcast and multicast service (MBMS) in principle and MBMS means a service for simultaneously transmitting the same signal by several cells. The control region 1021 of the second subframe may be a RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval 1021 and performs the backhaul downlink reception from the eNodeB in the remaining region 1022. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region 1022. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval 1022 except for the guard time. Such PDCCH and the PDSCH are physical channels dedicated for RN and thus may be represented by an R-PDCCH (Relay-PDCCH) and an R-PDSCH (Relay-PDSCH).

Communication Between UEs

Communication between a primary UE and a secondary UE proposed by the present invention may be performed on uplink (UL) resources or downlink, (DL) resources. If UL resources are used for communication between UEs (a UL frequency band is used in an FDD system and a UL subframe is used in a TDD system), the UE may fundamentally have transmission capability on UL resources in order to transmit a signal to an eNB. In order to apply the present invention, one UE may further have reception capability on UL resources in order to communicate with another UE, in addition to transmission capability on UL resources. Alternatively, if DL resources are used for communication between UEs (a DL frequency band is used in an FDD system and a DL subframe is used in a TDD system) the UE may further have transmission capability in addition to reception capability on DL resources.

Hereinafter, an embodiment of the present invention in which communication between a primary UE and a secondary UE uses a modification of the existing DL subframe structure will be described. If communication between UEs is performed using UL resources, a DL subframe structure is used to transmit a signal from one UE to another UE but such a DL subframe structure may be used in a band swapping manner configured on UL resources, not on DL resources.

Embodiment 1

The present embodiment relates to a method of using the existing D relay subframe structure.

Figure 11:
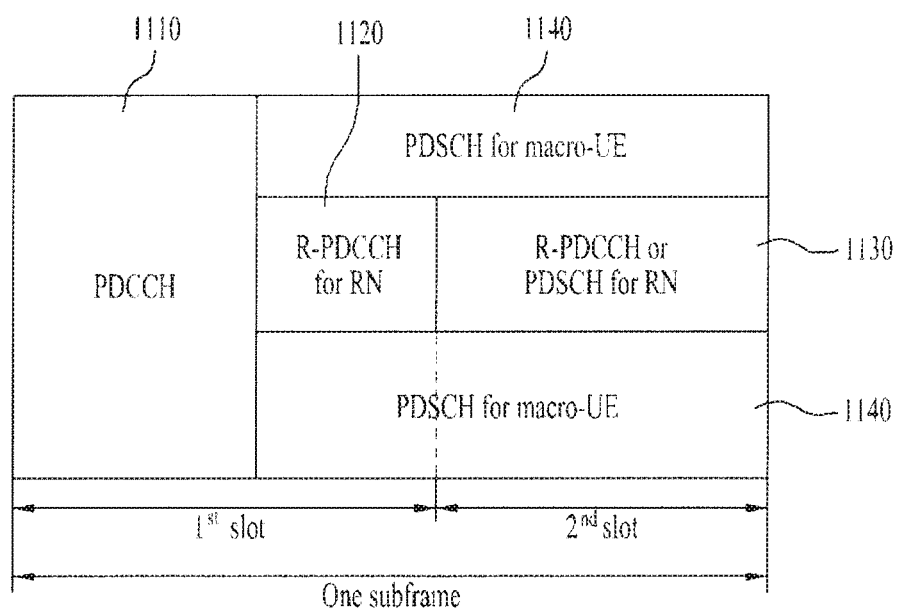
FIG. 11 is a diagram showing the structure of a DL relay subframe.

FIG. 11 is a diagram showing the structure of the existing DL relay subframe. The DL relay subframe structure is fundamentally similar to the second subframe 1020 of FIG. 10 and details thereof will be described with reference to FIG. 11. R-PDCCHs 1120 and 1130 are control channels for an RN and may located on OFDM (or SC-FDMA) symbols after a PDCCH 1110 which is a control channel for another macro UE (a UE which directly receives a service from a macro eNB). The RN may transmit a PDCCH to UEs served thereby in a PDCCH region 1110 and then perform transmission-reception (Tx-Rx) switching to receive R-PDCCHs 1120 and 1130 from an eNB. In a region in which the RN may receive a signal from the eNB, the R-PDCCH 1120 for DL allocation (or DL scheduling) may be transmitted on a first slot and a PDSCH for UL grant (or UL scheduling) or a PDSCH for an RN may be transmitted on a second slot (1130). A frequency region (e.g., PRBs) in which there is no R-PDCCH transmission may be used for PDSCH transmission for the macro UE (1140).

Figure 12:
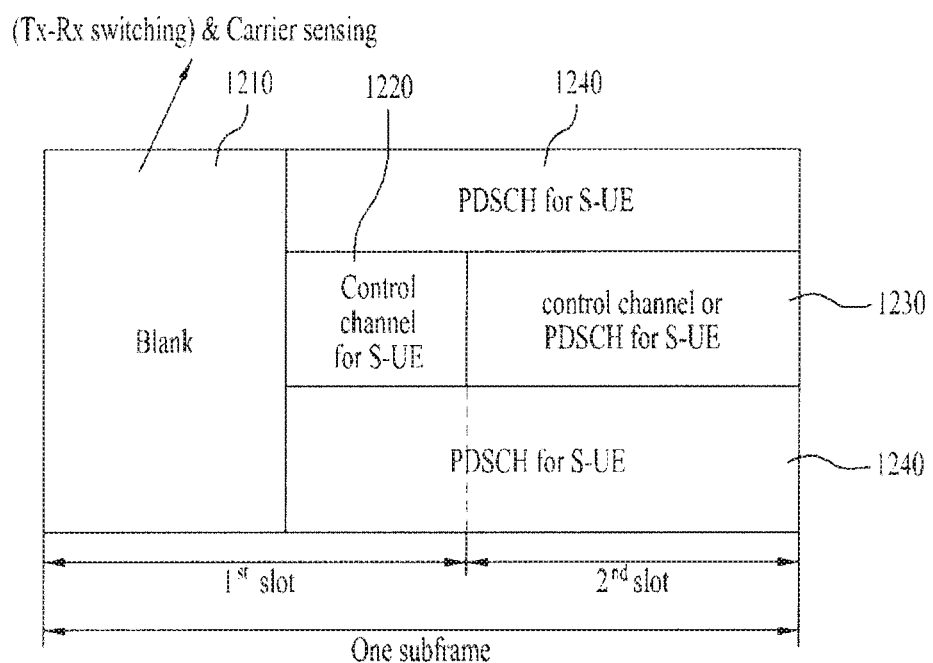
FIG. 12 is a diagram showing a subframe structure configured in DL resources according to an example of the present invention.

In the present embodiment, the PDCCH region 1110 of FIG. 11 is blank and is used for carrier sensing of the primary UE and/or the secondary UE. FIG. 12 is a diagram showing a subframe structure according to the present embodiment.

A UE may sense a carrier signal of a corresponding subframe in a PDCCH region 1210. Carrier sensing means detecting transmission/reception of another adjacent UE in a corresponding region. If it is detected that another adjacent UE (e.g., the primary UE 130 of FIG. 1) transmits or receives a signal in a corresponding subframe, communication between the primary UE and the secondary UE using relatively low transmit power may receive strong interference by signal transmission/reception of another adjacent UE. Carrier sensing in the PDCCH region 1210 may be performed by the primary UE and/or the secondary UE. As a result, if it is determined that signal transmission/reception of another adjacent UE in the PDCCH region 1210 of a certain subframe is not performed, the subframe may be regarded as being used for communication between the primary UE and the secondary UE.

FIG. 12 shows an example of a subframe structure used for transmission from a primary UE (P-UE) to a secondary UE (S-UE).

If the present embodiment is applied to UL resources, the primary UE which was in a transmission mode in a previous subframe additionally performs Tx-Rx switching in a part (one or more OFDM (or SC-FDMA) symbols) of a blank region 1210 and then performs carrier sensing in the remaining region until a control channel 1220 for the secondary UE is transmitted. At this time, the control channel for the secondary UE may be newly defined or the existing channel structure may be reused. For example, an R-PDCCH defined in a DL relay subframe structure may be used as a control channel for S-UE. A control channel transmitted in the existing data region, such as an R-PDCCH, may be referred to as an e-PDCCH. FIG. 12 shows an example in which the secondary UE operates in a reception mode, in which a second slot 1230 of a PRB in which an R-PDCCH (or an e-PDCCH) is present, may be used to transmit an R-PDCCH (or e-PDCCH) or PDSCH for the secondary UE. A PRB 1240 in which an R-PDCCH is not present may be used to transmit PDSCH for the secondary UE.

Embodiment 2

The present embodiment relates to a subframe structure when a secondary LTE operates in a transmission mode. The present embodiment may include a method of utilizing only a second slot and a method of utilizing both first and second slots for transmission of the secondary UE.

Embodiment 2-1

The present embodiment relates to a method of utilizing only a second slot for transmission of a secondary UE.

FIG. 13 is a diagram showing a region in which Tx-Rx switching is performed in a subframe structure when only a second slot is utilized for transmission of a secondary UE. If only the second slot is utilized for transmission of a secondary UE, a primary UE must perform TX-RX switching in order to receive a signal in a reception mock, A last OFDM (or SC-FDMA) symbol of a first slot as shown in FIG. 13(a) or a first OFDM (or SC-FDMA) symbol of a second slot as shown in FIG. 13(b) may be used for Tx-Rx switching.

In the subframe structure of the example of FIG. 13, an R-PDCCH (or an e-PDCCH) and PDSCH for the secondary UE may be transmitted on the first slot. On the second slot, an R-PDCCH (or an e-PDCCH) for the secondary UE may be transmitted according to circumstances or a PDSCH for the primary UE or the secondary UE may be transmitted according to a transmission/reception mode of the secondary UE. That is, the PDSCH for the secondary UE may be transmitted in the reception mode and the PDSCH for the primary UE may be transmitted in the transmission mode.

The transmission/reception mode of the secondary UE may be determined via an indicator included in the R-PDCCH (or the e-PDCCH) of the first slot. For example, the indicator included in the control channel for S-UE of the first slot may be UL grant for a signal transmitted on the second slot. That is, the first slot may be used for DL allocation and UL grant transmission and the second slot may be used for PDSCH transmission.

Alternatively, the indicator included in the control channel for S-UE of the first slot may be defined as a trigger for determining a transmission/reception mode. In this case, a DL relay subframe structure may be reused in the first slot and UE grant may include an R-PDCCH (or an e-PDCCH) of the second slot. In this case, the secondary UE may preconfigure a signal to be transmitted based on previously received UL grant information and transmit the preconfigured signal in an arbitrary subframe when a trigger indicating transmission is received via a control channel for S-UE of a first slot of an arbitrary subframe.

If a signal is transmitted from the primary UE to the secondary UE using UL resources, the primary UE may not perform Tx-Rx switching between subframes when a signal is transmitted to an eNB in a UL subframe next to a subframe in which transmission to the secondary UE is performed. Accordingly, the primary UE may perform transmission using all OFDM (or SC-FDMA) symbols of the second slot. However, if a difference between power of a signal transmitted to the secondary UE and power of a signal to be transmitted to the eNB in a next subframe is large, a rapid output power change is necessary in an amplifier of the primary UE. In order to use a power amplifier for significantly changing an output in a very short time, cost may be increased or implementation may be impossible. In this case, a power change interval is necessary in a last portion of a subframe. Alternatively, if the primary UE transmits a signal to the secondary UE using DL resources, the primary UE must perform Tx-Rx switching in order to receive a signal from the eNB in a DL subframe next to a subframe in which transmission to the secondary UE is performed. Similarly to the primary UE, even in operation of the secondary UE, a power change interval or a Tx-Rx switching interval may be necessary in a last portion of one subframe. FIG. 14(a) and FIG. 14(b) show examples of defining a Tx-Rx switching interval (or a power change interval) in a last portion of a subframe in addition to the subframe of FIGS. 13(a) and 13(b).

In order to apply the subframe structure shown in FIG. 14, the primary UE may include an indicator in a control channel for the secondary UE. This indicator may inform the secondary UE as to whether the signal transmitted by the primary UE also includes a last OFDM (or SC-FDMA) symbol of a corresponding subframe.

Alternatively, the UE may always transmit/receive a signal using OFDM (or SC-FDMA) symbols excluding a last OFDM (or SC-FDMA) symbol without defining a separate indicator. Alternatively, the UE may always transmit/receive a signal using OFDM (or SC-FDMA) symbols including the last OFDM symbol without defining a separate indicator. In this case, it is possible to simply implement transmission/reception between a P-UE and S-UE without separate control signaling overhead.

Embodiment 2-2

The present embodiment relates to a method of utilizing both first and second slots for transmission of a secondary UE.

FIG. 15 shows a subframe structure when both first and second slots are utilized for transmission of the secondary UE. In a method of transmitting a signal from the secondary UE to the primary UE, as in the examples of FIGS. 13 and 14, the transmission/reception mode of the secondary UE in the second slot may not be determined via the R-PDCCH (or the e-PDCCH) in the first slot and the secondary UE may be defined to transmit a signal in both first and second slots at a predefined time as shown in FIG. 15. In this case, since a Tx-Rx switching interval is not necessary within a subframe, more OFDM (or SC-FDMA) symbols may be used for signal transmission of the secondary UE. The subframe corresponding to the predefined time when the secondary UE operates in the transmission mode may be predetermined when a predetermined time has elapsed after UL grant is received (after four subframes (that is, 4 ms)). Alternatively, the subframe corresponding to the predefined time when the secondary UE operates in the transmission mode may be specified via an R-PDCCH (an e-PDCCH) for the secondary UE and the secondary UE may perform transmission using both first and second slots in the specified subframe.

In addition, the secondary UE which receives UL grant may be defined to transmit a signal in one or several subframes after the specified time has elapsed. In this case, the secondary UE may always perform transmission in only one subframe after the specified time or the primary UE may indicate the number of subframes used for transmission of the secondary UE based on information about a buffer status report of the secondary UE when the primary UE transmits UL grant. Alternatively, the number of subframes to be used for transmission may be determined by the secondary UE. For example, a flag indicating whether continuous data transmission is performed within a PDSCH for the primary UE may be defined and the number of subframes to be used for transmission of the secondary UE may be controlled via this flag information.

Since the primary UE is set to the reception mode at a predefined time, the secondary UE may transmit a signal in all OFDM (or SC-FDMA) symbols as shown in FIG. 15(a).

Alternatively, as shown in FIG. 15(b), the secondary UE may perform carrier sensing in some OFDM (or SC-FDMA) symbols of a subframe and then transmit a signal. In this case, if it is determined that the secondary UE may perform transmission via carrier sensing, the secondary UE may transmit a signal to the primary UE. If it is determined that signal transmission may not be performed, the secondary UE may receive new UL grant and attempt retransmission. Alternatively, subframes for retransmission may be defined in advance and the secondary UE may attempt retransmission in the subframes and the primary UE, may be set to a reception mode. Alternatively, retransmission may be continuously attempted until transmission of the secondary UE becomes possible. At this time, the number of subframes which may be used for retransmission of the secondary UE may be unrestricted or may be restricted to a predetermined value and the primary UE may transmit UL grant if the predetermined value is reached.

If transmission of the secondary UE on UL resources is performed as in the example of FIG. 15 and then transmission to the eNB is performed in a next subframe, a power change interval may be necessary. Alternatively, in a next subframe after transmission of the secondary UE on DL resources is performed as in the example of FIG. 15, a Tx-Rx switching interval may be necessary for DL reception. In this case, as shown in FIG. 16, a Tx-Rx switching interval or a power change interval may be defined in a last portion of the subframe.

FIGS. 16(a) and 16(b) show examples of defining a Tx-Rx switching interval (or a power change interval) in a last portion of a subframe in addition to the subframe structure of FIGS. 15(a) and 15(b).

In order to apply the subframe structure shown in FIG. 16, it is possible to indicate whether a last OFDM (or SC-FDMA) symbol of a subframe is used for transmission of the secondary UE in advance. For example, an indicator indicating whether the last OFDM (or SC-FDMA) symbol of the subframe is used for transmission of the secondary UE may be included in a control channel for the secondary UE. Alternatively, the UE may always use or may not use a last OFDM (or SC-FDMA) symbol of a subframe without defining a separate indicator. In this case, it is possible to simply implement transmission/reception between a P-UE and S-UE without separate control signaling overhead.

Embodiment 3

The present embodiment relates to a method of utilizing UL resources (a UL frequency hand in an FDD system and a UL subframe in a TDD system) in communication between the primary UE and the secondary UE.

According to the present embodiment, since the primary UE already has UL transmission capability for communication with the eNB, it is possible to perform communication between the primary UE and the secondary UE without additional DL transmission capability. According to the present embodiment, it is possible to mitigate interference generated by communication between another UE and the eNB. For example, since the eNB generally transmits a signal with a very high intensity (e.g., a CRS, a primary synchronization signal (PSS), a secondary synchronization signal (SSS), a physical broadcast channel (PBCH), etc.) using DL resources, UL resources are used for communication between UEs instead of DL resources so as to avoid interference generated by a strong signal transmitted from the eNB to another UE. If DL resources are used for communication between UEs, communication between the primary UE and the secondary UE may cause strong UE-to-UE interference when another adjacent UE receives a DL signal from the eNB. However, in the embodiment, if UL resources are used for communication between UEs, interference may not be caused when another adjacent UE receives a DL signal from the eNB.

Figure 17:
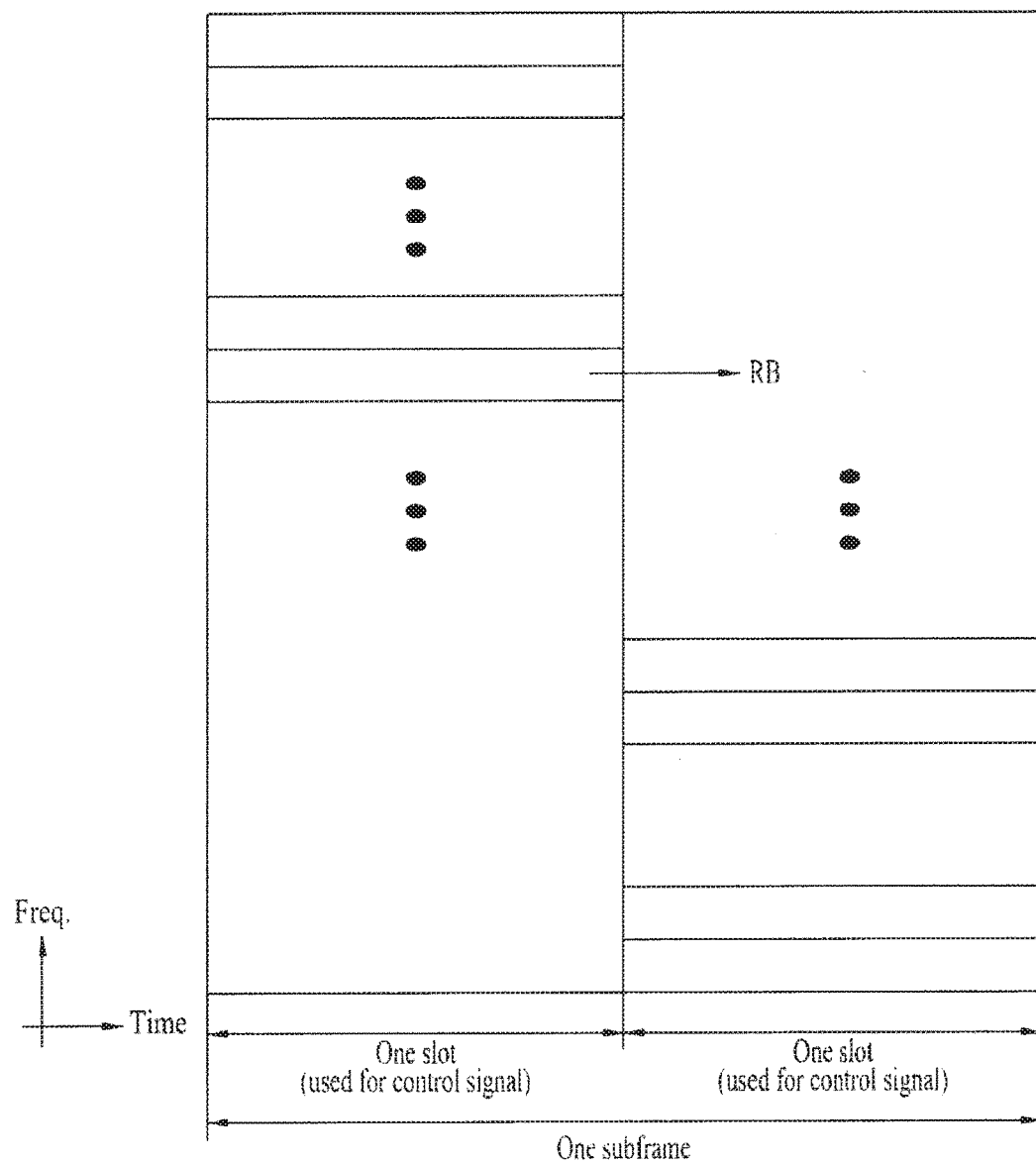
FIG. 17 is a diagram showing a subframe structure configured in UL resources according to an example of the present invention.

In the present embodiment, a method of utilizing two slots configuring one UL subframe for different purposes is proposed. FIG. 17 is a diagram showing a UL subframe structure according to the present embodiment. As shown in FIG. 17, a first slot of one UL subframe may be used for a region for transmitting/receiving a control signal and a second slot thereof may be used for a region for transmitting/receiving a data signal. In particular, the second slot used for the data region may be configured equally to that used for PUSCH transmission defined in the existing UE system. For example, configuration of an uplink demodulation reference signal (DMRS), physical resource mapping and modulation and coding scheme defined in the existing LTE system may be used without change. While PUSCH transmission is performed over two slots of a UL subframe in the existing UE system, data transmission is performed only in the second slot in the present embodiment. In this case, since the existing PUSCH transmission scheme may be reused for data communication between UEs, it is possible to minimize increase in complexity for implementing data communication between UEs. In addition, in order to more simply define communication between UEs, a signal transmitted in the second slot may be defined to occupy a specific bandwidth in advance. For example, the signal transmitted in the second slot may be predefined to occupy an overall system bandwidth.

If UL transmission from the primary UE to the eNB is performed in a specific UL subframe, the primary UE may not perform communication with the secondary UE connected thereto in the UL subframe. Accordingly, communication between the primary UE and the secondary UE may be restricted to be performed only in a subframe in which the primary UE does not perform transmission to the eNB. The primary UE may be aware of whether the primary UE performs UL transmission to the eNB in the UL subframe in advance. For example, in case of PUSCH, SRS, UL ACK/NACK transmission dynamically scheduled to the primary UE by the eNB, such a scheduling message may be sent to the UE before a minimum of 4 ms. In addition, the eNB may inform the primary UE as to when periodic channel state information (CSI) report, periodic SRS, semi-persistent scheduling must be transmitted in advance via higher layer signaling (e.g., RRC signaling). Accordingly, since the primary UE may determine a subframe in which transmission to the eNB is performed in advance, communication between the primary UE and the secondary UE may be performed in the remaining subframes.

Embodiment 4

The present embodiment relates to an OFDM (or SC-FDMA) configuration method for carrier sensing among detailed configuration methods of the first slot used as a control signal region in a UL subframe.

Figure 18:
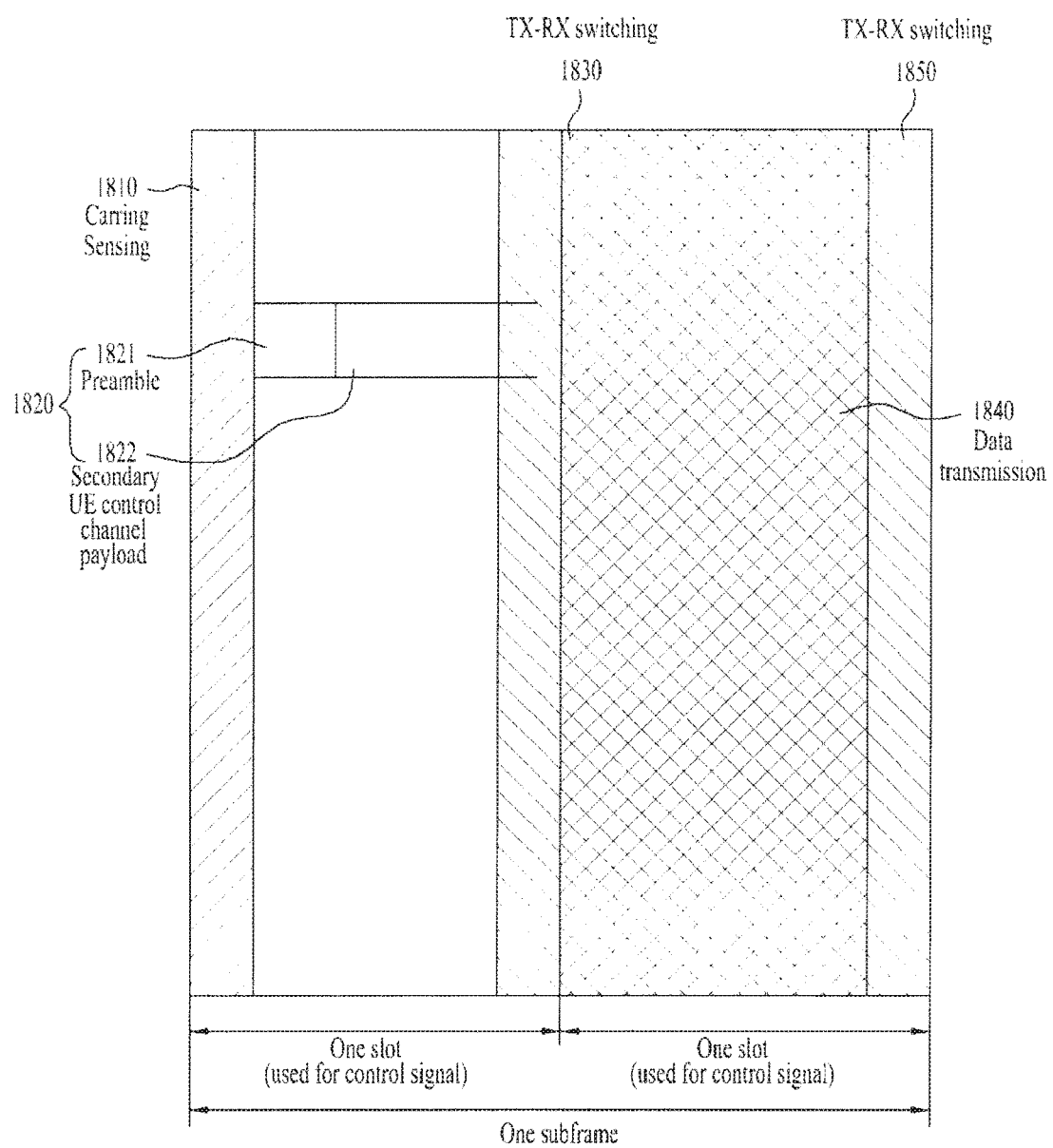
FIG. 18 is a diagram illustrating details of a subframe structure configured in UL resources according to an example of the present invention.

Referring to FIG. 18, the primary UE and/or the secondary LTE may sense a carrier signal in the first one or plurality of OFDM (or SC-FDMA) symbols 1810 of a subframe. Carrier sensing is used to determine whether transmission/reception of another adjacent UE is performed. If an adjacent UE performs signal transmission/reception in a subframe, communication between the primary UE and the secondary UE using relatively low transmit power may be subject to strong interference. If it is determined that signal transmission/reception of another adjacent UE is not performed in a subframe as the result of performing carrier sensing by the primary UE and/or the secondary UE, the subframe may be regarded as being used for communication between the primary UE and the secondary UE.

The size of the region 1810 (that is, the number of OFDM (or SC-FDMA) symbols) in which the primary UE and/or the secondary UE performs carrier sensing may be determined as follows. First, timing advance will be briefly described. If distances between UEs and an eNB are different, propagation delays from the UEs to the eNB are different. If the eNB receives uplink subframes from a plurality of UEs, the uplink subframes may be received at different timings. In order to solve such a problem, the eNB may signal appropriate timing advance values to the UEs, the UEs may control uplink subframe transmission timings according to the signaled timing advance values, and, as a result, the eNB may receive the uplink subframes from the plurality of UEs at the same timing.

If another UE is located far from the primary UE or the secondary UE (on the assumption that signal transmission/reception of the other UE causes interference with communication between UEs), a timing advance value used by the primary UE or the secondary UE and a timing advance value used by the other UE may be different. In this case, it is necessary to substantially consider propagation delay from the other UE to the primary/secondary UE. That is, a signal transmitted in a first OFDM (or SC-FDMA) symbol of an uplink subframe of the other UE may generate interference with respect to the primary/secondary UE at timings of the OFDM (or SC-FDMA) symbols other than the first symbol of the uplink subframe of the primary/secondary UE due to propagation delay. Accordingly, if the number of OFDM (or SC-FDMA) symbols for carrier signal sensing is not sufficient, the signal transmitted by the other UE may reach the primary/secondary UE after carrier sensing of the primary/secondary UE has been finished. In order to solve such a problem, the eNB may set the number of OFDM (or SC-FDMA) symbols 1810 to be used for carrier sensing by the primary/secondary UE with respect to the primary/secondary UE via a higher layer signal, etc. For example, the eNB may inform the primary/secondary UE of the number of OFDM (or SC-FDMA) symbols 1810 to be used for carrier sensing based on a distance of the other UE which may obstruct communication between the primary UE and the secondary UE within the cell.

The transmission/reception operation of the primary UE and/or the secondary UE may be determined according to the carrier sensing result. For example, the primary UE may schedule and transmit data transmission in the second slot to the secondary UE if another adjacent UE is not detected as the carrier sensing result. Similarly to the primary UE, the secondary UE may perform carrier sensing before a transmission operation and perform a transmission operation in the second slot according to an instruction of the primary UE only when another UE which performs communication in the subframe is not detected.

Embodiment 5

The present embodiment relates to a method of configuring a control channel for a secondary UE among detailed configuration methods of a first slot used as a control signal region in a UL subframe. That is, the primary UE may transmit a control channel for the secondary UE (on 1820 of FIG. 18) using some OFDM (or SC-FDMA) symbol(s) after an OFDM (or SC-FDMA) symbol in which carrier sensing is performed. An indicator (Tx/Rx indicator) indicating whether the secondary UE performs a transmission operation or a reception operation in the second slot of the subframe may be included in the control channel for the secondary UE of the first slot.

If the indicator (Tx/Rx indicator) included in the control channel for the secondary UE indicates transmission of the secondary UE in a certain subframe, the primary UE may add an identifier of the secondary UE to the control channel. Thus, the secondary UE having the identifier may be instructed to transmit data in the second slot of the subframe.

In addition, the secondary UE which receives the identifier may multiplex an ACK/NACK signal indicating whether data received from the primary UE is successfully received (or decoding is successfully performed) with data (1840 of FIG. 18) transmitted in the second slot and transmit the multiplexed signal. The operation of multiplexing the ACK/NACK signal with the data by the secondary UE may be performed according to an instruction of the primary UE and the primary UE may add an ACK/NACK multiplexing request indicator to the control channel for the secondary UE.

In this case, as an example of multiplexing the ACK/NACK signal with the data by the secondary UE, a method of piggybacking a PUCCH on a PUSCH may be used. As such a piggybacking method, as defined in 3GPP LTE, if PUCCH transmission and PUSCH transmission must be simultaneously performed, a method of piggybacking the PUCCH on resources allocated for the PUSCH may be reused. That is, the secondary UE may insert the ACK/NACK signal into a portion of resources (1840 of FIG. 18) used to transmit data instead of the data signal transmitted by the secondary UE and transmit the resources to the primary UE.

If ACK/NACK indicating, whether one or more pieces of data have been successfully received from the primary UE up to now must be transmitted, ACK information is transmitted only when all one or more pieces of data have been successfully decoded and, otherwise (that is, if one or more pieces of data fails to be decoded) NACK information is transmitted.

If the primary UE transmits the control channel indicating that the secondary UE will receive data to the secondary UE but the secondary UE does not detect the control channel, the secondary UE does not receive data indicated by the control channel which is not detected. However, since the secondary UE is not aware that the primary UE has transmitted the control channel and the data, the secondary UE may determine that all data transmitted by the primary UE has been received and transmit ACK, although specific data fails to be received. ACK transmitted from the secondary UE to the primary UE may not indicate reception failure. In order to prevent such a problem, the primary UE may use a counter indicating the number of times of transmission of data to a specific secondary UE. That is, the primary UE may increase the counter one by one whenever data is transmitted to the secondary UE and check whether the secondary UE does not receive specific data of a plurality of pieces of data.

If the indicator (Tx/Rx indicator) included in the control channel for the secondary UE indicates transmission of the secondary UE in a certain subframe but does not include the identifier of a specific secondary UE, the primary UE may use the second slot of the subframe for random access of the secondary UEs. Alternatively, the second slot may be indicated for random access of the secondary UEs using a predefined special indicator (alternatively, the above Tx/Rx indicator may have a predefined special value) included in the control channel for the secondary UE. That is, if the secondary UE, receives the indicator indicating transmission but the indicator does not include the identifier of the specific UE or if the predefined special indicator is included, the secondary UE may perform a random access procedure. Through the random access procedure, the secondary UE may transmit, to the primary UE, a signal (scheduling request) for requesting scheduling of the secondary UE or a signal (buffer status report) indicating information such as the amount of data stored in a buffer thereof.

Figure 19:
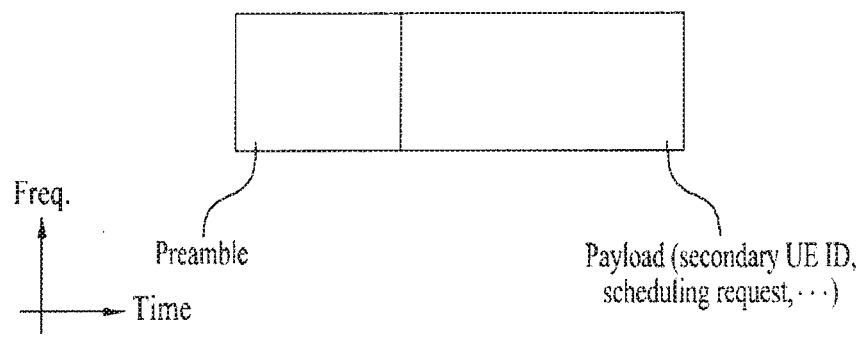
FIG. 19 is a diagram showing an example of a signal structure used by a secondary UE for random access according to an example of the present invention.

FIG. 19 is a diagram showing an example of a signal structure used by a secondary UE for random access. The example of the signal used for random access of FIG. 19 may be transmitted from the secondary UE to the primary UE in the data region 1840 of the second slot of FIG. 18. In the example of FIG. 19, the secondary UE transmits a preamble for signal detection or channel estimation and then transmits payload such as secondary UE ID, scheduling request or buffer status report. Here, since communication between UEs is performed over a short distance, the preamble preferably occupies a small number of SC-FDMA symbols if possible. For example, random access preamble format 4 defined in 3GPP LTE may be reused as the preamble (see section 5.7.1 of 3GPP TS 36.211). In addition, in order to enable the primary UE to more easily detect random access from the secondary UE, resources (RBs) used for random access from the secondary UE may be predefined or restricted to resources specified by the primary UE.

If the indicator (Tx/Rx indicator) included in the control channel for the secondary UE indicates reception of the secondary UE in a certain subframe, the primary UE may add the secondary UE ID to the control channel and indicate that the secondary having the identifier receives data in the second slot of the subframe. Alternatively, if the indicator (Tx/Rx indicator) included in the control channel for the secondary UE indicates reception of the secondary UE in a certain subframe, the primary UE may include a predefined specific indicator in the control channel and indicate that all secondary UEs connected to the primary UE receive data in the second slot of the subframe. This is advantageous when a variety of control information which must be received by all secondary UEs is transmitted via the data region (1840 of FIG. 18).

Additionally, the control channel for the secondary UE in a certain subframe may include a variety of control information such as an ACK/NACK signal indicating whether the primary UE successfully receives data previously transmitted by the secondary UE. The structure of such a control channel will be described with reference to FIG. 20.

Figure 20:
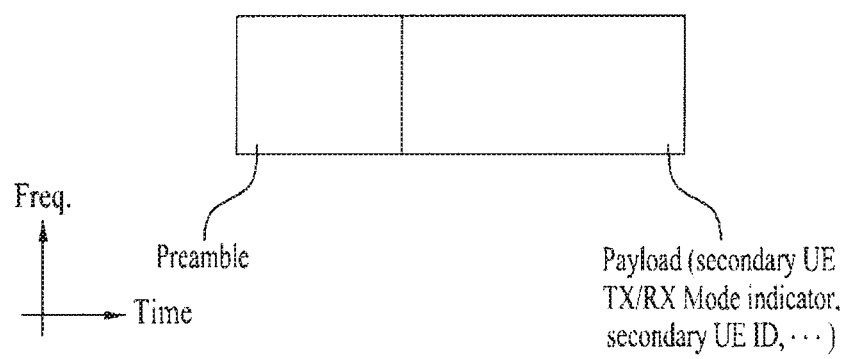
FIG. 20 is a diagram showing an exemplary structure of a control channel for a secondary UE according to an example of the present invention.

FIG. 20 is a diagram showing an exemplary structure of a control channel for a secondary UE. The control channel shown in FIG. 20 may be transmitted from the primary UE to the secondary UE on the control channel region 1820 of the first slot of FIG. 18. As shown in FIG. 20, the control channel may include a preamble and a payload that respectively correspond to the preamble 1821 and the control channel payload 1822 of FIG. 18. The preamble of the control channel may be used for signal detection and channel estimation and the payload of the control channel may include a Tx/Rx indicator indicating transmission/reception of the secondary UE, a secondary UE ACK/NACK, etc.

The random access format of the secondary UE shown in FIG. 19 and the basic structure of the control channel for the secondary UE shown in FIG. 20 are equally designed to further reduce complexity of the UE operation.

As shown in FIG. 18, the last one or plurality of OFDM (or SC-FDMA) symbols 1830 of the first slot may be set to null symbol(s) in which no signal is transmitted by the primary UE. During this portion 1830, Tx-Rx switching of the primary UE and/or the secondary UE may be performed. Next, a configuration method of a second slot of a subframe structure proposed by the present invention will be described.

Embodiment 6

The present embodiment relates to a detailed configuration method of a second slot used as a data signal region in a UL subframe.

If the primary UE must receive a signal from the secondary UE in a certain subframe and transmit a signal to the eNB in a next subframe, in order to ensure a time for switching the primary UE from a reception mode to a transmission mode, last one (or a plurality of) OFDM (or SC-FDMA) symbols of the subframe may not be used for signal transmission of the secondary UE (signal reception by the primary UE from the secondary UE). That is, a Tx-Rx switching region 1850 of FIG. 18 may be configured. The primary UE may include an indicator indicating whether the last one or plurality of OFDM (or SC-FDMA) symbols of the second slot is used for data transmission in the control channel 1820 for the secondary UE of the first slot. Alternatively, the secondary UE which receives information indicating transmission to the primary UE in the second slot may always perform data transmission using only the OFDM (or SC-FDMA) symbol of the second slot excluding the last one (or the plurality of) OFDM (or SC-FDMA) symbols. In this case, an indicator indicating whether the last OFDM (or SC-FDMA) symbol of the second slot is used does not need to be included in the control channel of the first slot such that the UE operation is more simply defined.

Meanwhile, if the primary UE must transmit a signal to the second UE in a certain subframe and transmit a signal to the eNB in a next subframe, Tx/Rx switching of the primary UE is not necessary. Accordingly, the primary UE may use all OFDM (or SC-FDMA) symbols of the second slot for data transmission. If a difference between power of a signal transmitted from the primary UE to the secondary UE in the subframe and power of a signal transmitted to the eNB in a next subframe is large, power output from the amplifier of the primary UE is rapidly changed. Thus, it is necessary to configure a power change interval similarly to the above-described Tx-Rx switching interval 1850.

The primary UE may include one indicator in the control channel for the secondary UE and inform the secondary UE as to whether the data transmitted by the primary UE is included even in the last OFDM (or SC-FDMA) symbol or whether the power change interval is configured using this indicator. Alternatively, without defining this indicator, the primary UE may be configured to always transmit data using symbols excluding the last OFDM (or SC-FDMA) symbols. In this case, it is possible to mitigate complexity of the UE operation.

Embodiment 7

Scheduling of signal transmission/reception to/from the secondary UE by the primary UE was described in the above-described examples. Hereinafter, as another method for communication between UEs proposed by the present invention, a method of directly scheduling communication between UEs at an eNB will be described. However, examples of subframe structures, resource configurations and channel structures described in Embodiments 1 to 6 or one or more combinations thereof are applicable to the method of directly scheduling communication between UEs at the eNB.

If the eNB directly performs scheduling of communication between UEs, the primary UE and the secondary UE read a scheduling message of the eNB (e.g., a UL/DL scheduling message transmitted by the eNB via a PDCCH) and confirm on which resource communication between UEs is scheduled or when communication between UEs is scheduled.

Embodiment 7-1

The present embodiment relates to a method of reading the same scheduling message at a primary UE and a secondary UE.

The eNB may transmit one scheduling message and two UEs (the primary UE and the secondary UE) read this message and confirm information about communication between UEs. The eNB may configure a UE communication pair for performing mutual communication. One UE communication pair may include one primary UE and one secondary UE in case of unicast or include one primary UE and a plurality of secondary UEs in case of multicast. From the viewpoint of the eNB, a plurality of UE communication pairs may be configured. The eNB may assign a unique identifier (ID) to each UE communication pair and transmit a scheduling message according to the ID of the UE communication pair. The UE belonging to each UE communication pair may detect a scheduling message using the ID assigned to the UE communication pair to which the UE belongs (for examples, decodes a PDCCH CRC-masked with the UE communication pair ID), thereby confirming scheduling information (resources such as time/frequency) of the UE communication network pair to which the UE belongs.

The UE communication pairs may be assigned separate IDs according to directivity. For example, assume that transmission/reception between two UEs (e.g., UE1 and UE2) is alternately and repeatedly performed. In this case, the eNB may assign one ID to a UE communication pair which is transmitted by the UE1 and received by the UE2 and assign another ID to a UE communication pair which is transmitted by the UE2 and received by the UE1. If the ID is assigned to the UE communication network pair according to the transmission/reception direction, since a determination as to which UE performs transmission or which UE performs reception is made by only decoding the scheduling message (that is, since a separate signal indicating a transmission UE or a reception UE is not necessary), it is possible to reduce complexity of the UE operation.

However, if the ID assigned to the UE communication pair varies according to directivity, the number of IDs to be assigned to individual UEs by the eNB may be increased as compared to the case in which the ID is assigned to the UE communication pair regardless of directivity (that is, without distinction between the transmission/reception side). Accordingly, the ID may be assigned to the UE communication pair regardless of directivity without distinction between the transmission/reception side (that is, the same ID is assigned to the UE communication pair which is transmitted by the UE1 and received by the UE2 and the UE communication pair which is transmitted by the UE2 and received by the UE1). In this case, a separate signaling field may be defined in a scheduling message to indicate a transmission side and a reception side.

If the ID is assigned to the UE communication pair, one UE may have two or more IDs with respect to UL transmission. For example, one ID is for UL transmission to the eNB and another ID is for transmission to another UE.

A variety of uplink control information indicated by the eNB may be separately managed according to ID. For example, in case of closed loop power control for increasing or decreasing transmit power during a certain time to a predetermined level as compared to the existing transmit power, the UE may accumulate only power control command transmitted via the same ID and accumulate power control commands transmitted via another ID. This is because the reception side to be scheduled is changed according to ID and thus the appropriate power control value is changed according to the reception side. For example, if the eNB does not indicate what receives uplink control information (e.g., an eNB or a UE), the UE which receives uplink control information is not directly aware of an uplink transmission destination but applies control information of uplink transmission which varies according to destinations if uplink control information is managed using the ID assigned according to the uplink reception side.

Alternatively, in case of transmission for communication between UEs, transmit power having a predetermined level (e.g., minimum transmit power) may be defined in advance without separate power control. Since communication between UEs is generally performed over a short distance, communication may be performed with low transmit power. In this case, be eNB may not provide an uplink power control command to a UE communication pair ID for communication between UEs or the UE may ignore the power control command if the power control command is included in the scheduling message for the UE communication pair ID.

Embodiment 7-2

The present embodiment relates to a method of reading a separate scheduling message at a primary UE and a secondary UE.

The eNB may transmit a separate scheduling message to UEs that communicate with each other. Each UE may read the scheduling message corresponding to the ID thereof and detect the location of resources used to schedule communication between the UEs. In this method, since the ID used for communication between each UE and the eNB may be used in a scheduling message for communication between UEs, it is possible to mitigate complexity of the UE operation in view of detection of the scheduling message. For example, since the UE performs PDCCH blind decoding with only one ID regardless of whether communication with the eNB or communication with another DE is performed, PDCCH blind decoding is not performed with an ID which varies according to the type of a communication counterpart and thus decoding delay may be reduced.

If only one ID is assigned to each UE regardless of the type of the communication counterpart, the eNB may define a separate signaling field in the scheduling message and indicate whether scheduling information is for transmission to the eNB or transmission to another UE or whether the UE which receives the scheduling message receives a signal from another UE using the field.

In addition, the signaling field (the field indicating the communication counterpart and the transmission/reception side) may be associated with uplink power control of the which receives the scheduling message. That is, the power control command is transmitted via a PDCCH masked with the same ID regardless of the communication counterpart, but the power control command must be separately accumulated if the content of the signaling field is the same. For example, the power control command included in the scheduling message must be added to the power control commands included in the scheduling message for transmission to the eNB if the scheduling message received at a specific time is for transmission to the eNB and must not be added to the power control commands included in the scheduling message in the other case (e.g., transmission to another UE).

Alternatively, in case of transmission for communication between UEs, transmit power having a predetermined level (e.g., minimum transmit power) may be defined in advance without separate power control. Since communication between UEs is generally performed over a short distance, communication may be performed with low transmit power. In this case, the eNB may not include an uplink power control command in the scheduling message for communication between UEs or the UE may ignore the power control command if the power control command is included in the scheduling message.

Embodiment 7-3

The present embodiment relates to a method of reading a scheduling message of a primary UE at a secondary UE.

According to the present embodiment, the primary UE may operate equally to Embodiment 7-2. That is, the primary UE may reuse the ID used for communication with the eNB without change and receive a scheduling message for communication between UEs. In this case, the eNB may not assign a separate ID to the secondary UE.

Meanwhile, the secondary UE may receive the ID of the primary UE from the eNB via a higher layer signal in advance and attempt to detect the scheduling message with the ID of the primary UE. This may mean that the secondary UE overhears the scheduling message from the eNB to the primary UE. If the scheduling message is successfully read, the secondary UE may check when the primary UE transmits a signal thereto using which resources.

It is necessary to determine whether the scheduling message for the primary UE read by the secondary UE is for transmission from the primary UE to the eNB or for transmission from the primary UE to the secondary UE. Accordingly, an indication field indicating a transmission destination of the primary UE may be added to the scheduling message.

The present embodiment is particularly advantageous in that a simple operation is possible without burden on blind decoding of the scheduling message if the secondary UE is not directly connected to the eNB and thus the secondary UE is not assigned an ID to be used to directly transmit a signal to the eNB.

Embodiment 7-4

The present embodiment relates to a method of reading a scheduling message using a random access procedure.

The primary UE may transmit a physical random access channel (PRACH) preamble to the eNB to request allocation of resources for communication between UEs. At this time, a PRACH preamble index, location of time and frequency resources, etc. for requesting communication between UEs may be predefined via a higher layer signal with respect to an individual primary UE. The primary UE which requires communication between UEs may transmit a PRACH preamble using predefined resources and attempt to decode a PDCCH masked with an RA-RNTI during a predetermined time. The RA-RATI is determined by the location of resources used to transmit the PRACH. As described above, if PRACH transmission resources are predefined, the RA-RATI used by the primary UE for decoding may be regarded as being predefined.

The eNB may schedule a PDSCH via the PDCCH masked with the RA-RNTI and inform the UE which transmits a PRACH preamble on the specified resources via this PDSCH of information for scheduling uplink resources used to transmit an uplink signal. That is, the primary UE may detect the PDCCH masked with the RA-RNTI, decode the PDSCH scheduled by the PDCCH and read uplink scheduling information (that is, a UL grant message) within the PDSCH, thereby determining resources to be used for communication between UEs.

The secondary UE may attempt to decode the PDCCH with the RA-RATI of the primary UE similarly to Embodiment 7-3. Since the size of this PDCCH is equal to that of uplink grant DCI format 0 or DCI format 1A for PDSCH compact scheduling in communication with the eNB, burden on blind decoding is not increased from the viewpoint of the secondary UE. Thus, the secondary UE may decode the PDCCH with the RA-RATI of the primary UE and read a UL grant message for the primary UE in communication between UEs. Therefore, the secondary UE may check via which resources the primary UE performs communication between UEs and appropriately perform a reception operation corresponding thereto. For such an operation, since the secondary UE knows the RA-RNTI of the primary UE in advance, the eNB or the primary UE may transmit, to the secondary UE, information for determining the RA-RNTI of the primary UE (e.g., information about an index used to transmit a PRACH preamble of the UE and time/frequency resources) in advance.

Even in this case, the primary UE must apply a power control command (that is, a power control command sent via the above-described random access procedure of the specific PRACH preamble) to communication between UEs without applying the power control command to communication with the eNB.

Embodiment 8

The present embodiment relates to a detailed method for connecting a secondary UE to an eNB.

For application of the above-described embodiments, the eNB needs to know presence/absence of the secondary UE and the eNB needs to know which secondary UE wishes to communicate with which primary UE. That is, there is a need for a method of connecting the secondary UE to the eNB in a state in which the eNB does not know presence/absence of the secondary UE. Since the secondary UE generally has low power, the secondary UE cannot be directly connected to the eNB and can be connected to the eNB via the primary UE. That is, the secondary UE may attempt to connect the primary UE and the primary UE may send connection attempt to the eNB, thereby informing the eNB that the secondary UE attempts connection.

The secondary UE cannot be directly connected to the eNB in uplink transmission. However, in downlink transmission, since the secondary UE performs only a reception operation from the eNB, the secondary UE may directly receive a signal from the eNB. In this case, the secondary UE may directly receive a response to a random access signal transmitted by the secondary UE from the eNB. For example, the secondary UE may receive the random access response via the PDCCH transmitted by the eNB.

For such an operation, the eNB may indicate PRACH resource information (PRACH preamble index, PRACH time/frequency resources, etc.) used when the secondary UEs are connected to the primary UE using a signal such as a broadcast message. At this time, generally, since a possibility that the primary UE and the secondary UE are close to each other is high, a preamble having a very short length, such as PRACH preamble format 4 defined in the LTE system, may be used in order to prevent much energy from being consumed for transmission of the PRACH preamble.

In addition, the primary UE may periodically or aperiodically transmit a specific signal such as SRS such that the secondary UE approaching the primary UE perceives presence of the primary UE. The secondary UEs may be informed of a configuration of periodic/aperiodic transmission of such a specific signal via the eNB. The configuration of the transmission of such a signal may include ID information of the primary UE so as to enable the secondary UE to check which primary UE transmits the specific signal. The secondary UE which receives such information receives the specific signal, perceives that the primary UE is present near the secondary UE and attempts initial connection to the primary UE. At this time, for transmit power control between the primary UE and the secondary UE, the intensity of the signal of the primary UE received by the secondary UE may be reported to the primary UE or the eNB.

Alternatively, the primary UE may transmit a PRACH preamble for random access and the secondary UE may detect the PRACH, thereby detecting a link between the two UEs. Since the PR ACH preamble occupies a bandwidth relatively less than that of SRS, it is possible to detect the link using less frequency resources. The eNB may inform the secondary UE of information about the PRACH transmitted by the primary UE via a higher layer signal such as RRC. The eNB may instruct the primary UE to transmit the PRACH preamble using PRACH resources (e.g., PRACH resources reserved for handover) other than PRACH resources which may be used by the UEs attempting initial connection. Additionally, in order to prepare for the case in which the secondary UE does not detect the primary UE signal, the eNB may instruct the primary UE to periodically transmit a specific PRACH preamble. The secondary UP which receives the configuration information of the transmission of the PRACH preamble transmitted by the primary UE from the eNB may attempt to detect the PRACH preamble of the primary LTE on IA, resources corresponding to the configuration information. Additionally, if the signal transmitted by the primary UP is randomized to be specific to the primary UE, the eNB may inform the secondary UE of information such as the ID of the primary UE such that the secondary UE can easily detect a signal from the primary UE.

Embodiment 9 in the above-described embodiments of the present invention, the case in which the secondary UP directly decodes the PDCCH from the eNB was described. At this time, when the number of PDCCH candidates decoded by the secondary UE is too large (that is, the number of times of blind decoding is large), complexity of the operation of the secondary UE is increased and power consumption is also increased.

Blind decoding means an operation in which, if various PDCCH DCI formats having different sizes are present, a reception side does not know the size of a DCI format of a PDCCH transmitted by a transmission side and attempts to decode candidates. In addition, blind decoding may be performed in a common search space of UEs and/or a UE-specific search space.

In order to mitigate burden on blind decoding of the secondary UE, a region in which the secondary UE performs blind decoding of the PDCCH from the eNB may be restricted. For example, the secondary UE may be configured to decode the PDCCH only in the common search space. In particular, if the primary UE and the secondary UE decode the same PDCCH, the secondary UE may be prevented from decoding the PDCCH in the UE-specific search space of the primary UE via such restriction. In addition, if transmission to the secondary UE is scheduled using a random access procedure, since the PDCCH transmitted with the RA-RNTI is transmitted in the common search space, it is possible to avoid unnecessary operation via such restriction.

Embodiment 10

In the above-described embodiments, a method of scheduling signal transmission/reception to/from the secondary UE at the primary UE and a method of directly scheduling communication between UEs at the eNB were described. Hereinafter, as another communication method between UEs proposed by the present invention, a method of enabling the eNB to allocate resources to be used for communication with the secondary UE to the primary UE and then performing communication between the primary UE and one or a plurality of secondary UEs using the resources will be described.

The eNB may periodically allocate specific frequency resources to the primary UE. More specifically, the eNB may specify frequency resources which may be allocated to the primary UE using higher layer signaling (e.g., RRC signaling) and indicate activation/deactivation of the specified frequency resources via a physical layer control signal. Such an operation may be configured similarly to the existing semi-persistent scheduling (SPS). However, since resources allocated to the primary UE by the eNB are for communication between UEs, the present invention is different from the SPS scheduling method. That is, a subframe structure, a channel structure, a transmit power control method, etc. proposed by the above-described embodiments of the present invention for communication between the primary UE and the secondary UE within the resources allocated to the primary UE by the eNB are applicable.

Figure 21:
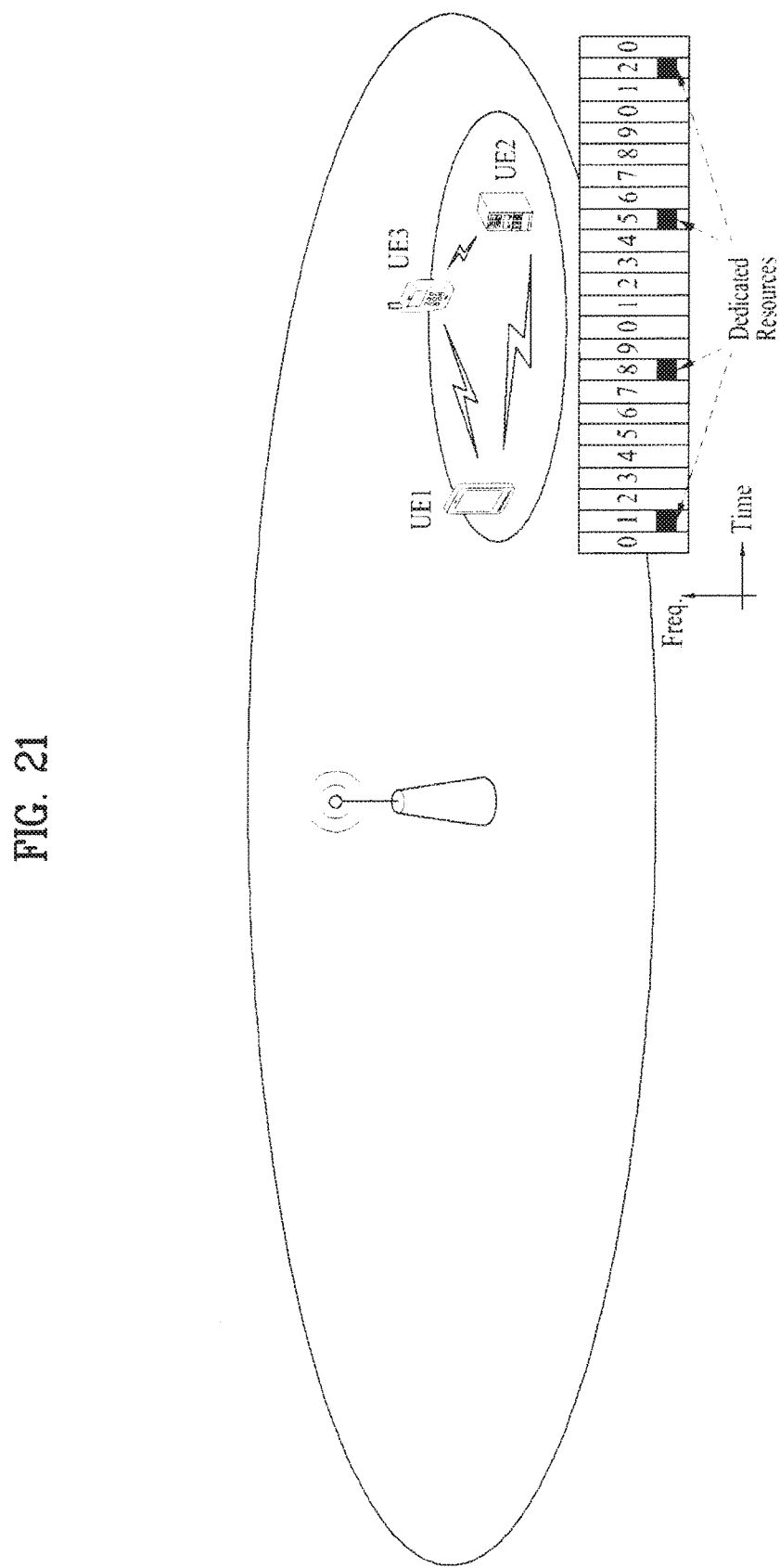
FIG. 21 is a diagram showing a wireless communication system in which communication between UEs is performed using resources specified by an eNB according to an example of the present invention.

FIG. 21 is a diagram showing a wireless communication system in which communication between UEs (that is, peer-to-peer communication) is performed using dedicated resources specified by an eNB. In FIG. 21, one of UE1, UE2 and UE3 is a primary UE to which the eNB may allocate resources in order to use specific frequency resources with a period of seven subframes. Communication between UE1, UE2 and UE3 may be performed using the resources.

In order to perform the operation of FIG. 21, the primary UE may transmit, to the eNB, information about resources necessary for communication with the secondary UE. Such information may include location information of the primary and/or secondary UE, a category of a service associated with communication between UEs (e.g., a voice service or a data service), the amount of necessary resources and/or duration, the number of secondary UEs, etc.

The eNB may determine resources to be allocated for communication between UEs based on information reported by the primary UE. Additionally, the eNB may restrict maximum power which may be used in the resources allocated for communication between UEs to a specific value and inform the primary and/or secondary UE of power restriction information, in order to enable the eNB to use the resources for communication of another UE (communication between another UE and the eNB or communication between another UE and another UE) separated from the location where communication between UEs is performed even when specific resources are allocated for communication between UEs. Since communication between UEs is generally performed between close UEs, communication may be performed with low transmit power. Thus, the eNB may restrict power used for communication between UEs to prevent interference with another UE.

In addition, since the eNB specifies the resources to be used for communication between UEs, the eNB may determine/control the amount of resources to be used for communication between UEs, quality (or interference level), maximum transmit power, etc. in consideration of the kind of a service (e.g., voice or data) associated with communication between UEs requested by the UE or a service fee, thereby controlling a data rate and coverage which may be used by the UE. For example, if the UE requests an inter-UE communication service having high quality (or pays a high fee according to high service quality), the eNB may allocate resources exclusive resources) which are expected to have a relatively low interference level, allocate a large amount of resources or allocate a high transmit power restriction value to allocate resources for communication between UEs, thereby providing a service having high quality, a high data rate and/or wide coverage. In contrast, if the UE requests an inter-UE communication service having low quality (or pays a low fee according to low service quality), the eNB may allocate resources shared resources) which are expected to have a relatively high interference level, allocate a small amount of resources or allocate a low transmit power restriction value to allocate resources for communication between UEs, thereby providing a service having low quality, a low data rate and/or narrow coverage.

In addition, the UE may transmit, to the eNB, location information (e.g., GPS information) of the UE when requesting an inter-UE communication service. The eNB may allocate resources for communication between UEs to the UE which requests the inter-UE communication service and, at the same time, allocate the same resources as the resources used for communication between UEs to another UE geographically separated from the UE (that is, another UE which does not participate in inter-UE communication requested by the UE) in consideration of the location of the UE which requests the inter-UE communication service. Since the UE which participates in communication between UEs and the other UE are geographically separated from each other, interference between the UEs may be expected to be low even when the same resources are allocated.

Additionally, when the eNB allocates the resources for communication between UEs, if the intensity of the signal of communication between the eNB and the other UE using the resources is large, resources allocated for communication between UEs may be subject to interference. In order to solve such a problem, the eNB may perform a silencing operation for reducing interference in the subframe corresponding to the resources allocated for communication between UEs. As an example of the silencing operation, a certain subframe may be configured as an almost blank subframe (ABS) (a subframe in which only a common reference signal (CRS) is transmitted and the remaining resource elements are blank) or as an MBSFN subframe (a subframe in which a CRS is also not transmitted in a data region).

In addition, if resources used for communication between UEs are fixed in a frequency region, the frequency region may consistently have a had channel status. Accordingly, in resource allocation for communication between UEs, frequency selective influence may be reduced using frequency hopping (a method of performing allocation while changing a frequency band).

Figure 22:
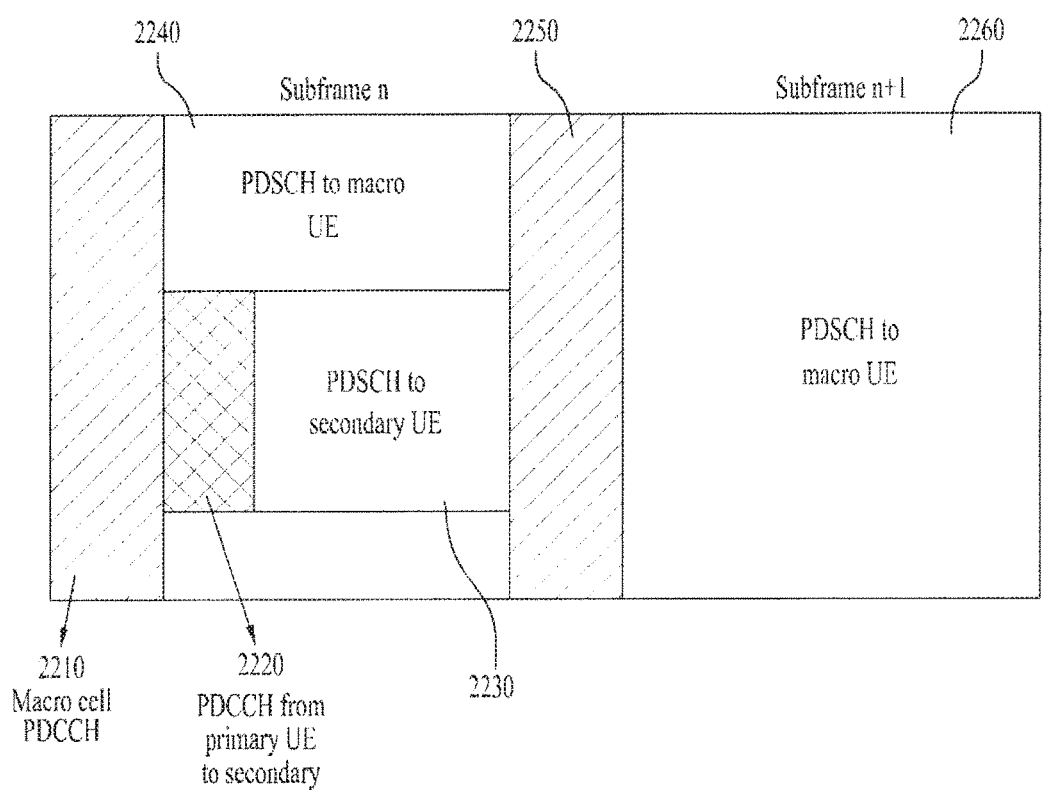
FIG. 22 is a diagram showing a subframe structure when a primary UE establishes a separate cell according to an example of the present invention.

In the resources allocated from the eNB to the primary UE for communication between UEs, the primary UE may establish a separate cell. FIG. 22 is a diagram showing a subframe structure when a primary UE establishes a separate cell. In FIG. 22, the eNB allocates DL resources to the primary UE as resources for communication between UEs. However, the present invention is not limited thereto and the subframe structure shown in FIG. 17 or 18 is applicable when the primary UE is allocated UL resources for communication between UEs.

In the example of FIG. 22, some time-frequency resources may be allocated for communication between UEs in a subframe n. For example, first several OFDM (or SC-FDMA) symbol(s) of the subframe n becomes a region in which a PDCCH is transmitted from the macro cell (that is, the eNB) and communication between the primary UE and the secondary UE may be performed in the remaining OFDM (or SC-FDMA) symbol(s) of the subframe n and the specific frequency regions 2220 and 2230. More specifically, the PDCCH from the primary UE to the secondary UE may be transmitted in the time-frequency region 2220 and the PDSCH from the primary UE to the secondary UE may be transmitted in the time-frequency region 2230. The region 2240 other than the PDCCH transmission region 2210 from the macro cell and the resource region 2220 and 2230 allocated for communication between UEs in the subframe n may be used to transmit the PDSCH to the macro UE (another UE which receives a service from the macro cell). Meanwhile, a subframe n+1 indicates a general subframe to which resources for communication between UEs is not allocated. For example, if the subframe n+1 is a downlink subframe, first several OFDM symbols 2250 correspond to a PDCCH transmission region of a macro cell and the remaining OFDM symbols 2260 correspond to a PDSCH transmission region from a macro cell to a macro UE.

As shown in FIG. 22, the primary UE may transmit a signal such as a CRS/PDCCH with a separate cell ID in the time-frequency resources 2220 and 2230 allocated by the eNB to perform communication with the secondary UE. The eNB may send, to the primary UE, information such as a cell ID to be used when the primary UE establishes a cell. The secondary UE may detect the location of the time-frequency resources in which the cell established by the primary UE appears (this information may be directly sent from the eNB to the secondary UE), acquire scheduling information from the cell established by the primary UE on the time-frequency resources, and perform appropriate measurement (measurement for RRM, RLM, etc.).

In addition, when the primary UE transmits/receives a PDSCH/PUSCH to/from the secondary UE in the cell established by the primary UE, it is necessary to define an operation when resources less than PDSCH/PUSCH transmission resources in a general cell are used. For example, as in the example of FIG. 22, if the primary UE is allocated DL resources for communication between UEs, first several OFDM symbols 2210 of a subframe in which the allocated DL resources are present are used for PDCCH transmission of the eNB (macro cell). That is, since the primary UE must transmit the PDSCH to the secondary UE using only the OFDM symbols less in number than the number of OFDM symbols (2260 of FIG. 22) used for PDSCH transmission in the general cell, the PDSCH may be transmitted by applying rate matching or puncturing. Although the primary UE transmits the PDSCH to the secondary UE when being allocated DL resources in FIG. 22, the PUSCH may be received from the secondary UE on the resources allocated for communication between UEs. Even in this case, since the secondary UE performs PDSCH transmission using SC-FDMA symbols less in number than the number of SC-FDMA symbols used for general PUSCH transmission, rate matching/puncturing is applicable. Meanwhile, if the primary UE is allocated UL resources for communication between UEs, since the PDCCH of the macro cell is not present in the allocated subframe, all SC-FDMA symbols of the UL resources may be used. In this case, the primary UE may transmit the PDCCH for the secondary UE from the first SC-FDMA symbol of the subframe of the allocated resources.

Meanwhile, the secondary UE may access both the cell (macro cell) established by the eNB and the cell established by the primary UE and perform transmission/reception to/from the respective cells. In this case, the secondary UE may perform data transmission/reception similarly to carrier aggregation. Carrier aggregation is introduced in order to aggregate a plurality of frequency bands (that is, carriers) to provide a large band. One of the frequency bands corresponds to a primary carrier (or a primary cell) and the remaining frequency bands correspond to secondary carriers (or secondary cells). If such carrier aggregation is applied, for example, a cell established by the eNB may be configured as a primary cell (PCell) and a cell established by the primary UE may be configured as a secondary cell (SCell). The example of the present invention is different from general carrier aggregation in that the SCell is present in some time/frequency regions of the PCell.

In addition, in order to reduce complexity of blind decoding of the secondary UE, only blind decoding of one cell may be performed in one subframe. For example, in the example of FIG. 22, in the subframe n in which the cell established by the primary UE (that is, SCell from the viewpoint of carrier aggregation (or from the viewpoint of the secondary UE)) is present, only the PDCCH of the cell (that is, SCell) of the primary UE may be searched for. In addition, in the subframe n+1 in which the cell (that is, SCell) of the primary UE is not present, only the PDCCH of the cell that is, PCell) of the eNB (from the viewpoint of carrier aggregation (or from the viewpoint of the secondary UE)) may be searched for. The search operation performed per PCell or SCell may be configured only in the UE-specific search space. That is, switching of the searching of the PDCCH of PCell or SCell is not applied in the common search space and only the PDCCH of one cell (e.g., PCell) is always searched for in the common search space.

Embodiment 11

The present embodiment relates to a detailed method of controlling transmit power of the primary UE in the various examples of the present invention.

The signal transmitted by the primary UE is classified into three types: a UL transmission signal (hereinafter, referred to as signal type 1) for transmitting data and a control signal from the eNB to the primary UE, a signal (hereinafter, referred to as a signal type 2) for transmitting data and a control signal from the primary UE to the secondary UE and a signal (hereinafter, referred to as a signal type 3) transmitted to detect the primary UE by dormant secondary UEs (UEs which are currently not connected to the primary UE but may be connected to the primary UE in the future).

Signal type 3 may be a signal such as SRS or PRACH periodically/periodically transmitted on UL resources or a reference signal periodically/periodically transmitted on DL resources. Here, the reference signal periodically/periodically transmitted on DL resources may be a CRS based on a cell ID separately allocated to the primary UE, a UE-specific RS (DRS) specific to the secondary UE or a CRS or CSI-RS for some antenna ports among CRSs or CSI-RSs configured by the eNB. The secondary UE may detect the primary UE and attempt access using signal type 3.

Hereinafter, an example of controlling transmit power according to signal type will be described in detail.

In case of signal type 1, as in existing communication between the eNB and the UE, the eNB may control transmit power. That is, the eNB provides a transmit power control (TPC) command to the primary UE such that the primary UE may control power of the signal transmitted to the eNB. For example, the TPC command may be provided as a relative value of previous transmit power and the UE may accumulate the TPC command to calculate transmit power to be applied.

Since signal type 2 is transmission from UE to UE, (as described in Embodiment 7) transmit power of signal type 2 may not be controlled simultaneously with transmit power of signal type 1 which transmission form the UE to the eNB but transmit power of signal type 2 may be controlled separately from transmit power of signal type 1. For example, the eNB may directly provide a transmit power control command to the primary UE to control transmit power of signal type 2 transmitted from the primary UE to the secondary UE or the eNB may set a maximum value of transmit power of the primary UE and the primary UE may control transmit power of signal type 2 in consideration of the status of the radio link between the primary UE and the secondary UE within the maximum value.

Since the main purpose of signal type 3 is to determine the distance between a certain secondary UE and a certain primary UE, in power control of signal type 3, it is important to accurately measure path loss between the primary UE and the secondary UE rather than power received by the secondary UE. Here, although the secondary LE reports the received signal intensity of signal type 3 to the eNB, the eNB must know transmit power of the signal (that is, power transmitted by the primary UE) in order to estimate path loss. Accordingly, there is a need for a transmit power control method of enabling the eNB to know the power used to transmit signal type 3 at the primary UE.

For example, the eNB may instruct the primary UE to fix the transmit power value of signal type 3 to a predetermined value using a higher layer signal (e.g., an RRC signal). In this case, since eNB knows that the primary UE always transmits signal type 3 with the predetermined fixed power value, since the received signal power value of signal type 3 is received from the secondary UE, path loss between the primary UE and the secondary UE may be calculated.

As another example, while the eNB controls transmit power of signal type 3 transmitted by the primary UE, the eNB may directly inform the primary UE of the transmit power value of signal type 3 whenever the primary UE transmits signal type 3. That is, the power control command from the eNB may not represent a relative value of previous transmit power but may represent an absolute value of transmit power to be applied to current transmission. In this case, if the UE misses a power control command in the method of accumulating the power control command provided as a relative value to derive a current transmit power value, it is possible to prevent generation of a difference between transmit power indicated by the eNB and transmit power applied by the UE.

As another example, the primary UE may report the transmit power value of currently applied signal type 3 to the eNB. The transmit power value may be reported periodically or when a specific event occurs (that is, in an event-triggered manner). The specific event may occur, for example, when receive power of a signal from a neighboring cell is equal to or greater than a predetermined threshold or when transmit power of signal type 3 is changed to a value having a predetermined difference with previous transmit power or may aperiodically occur when the eNB requests to report the transmit power value.

The above-described embodiments of the present invention are applicable to communication between UEs in a licensed band. The principle of the present invention is applicable to communication between a UE and an eNB in an unlicensed band. For example, assume that an LTE based system operates using a cognitive ratio method in an unlicensed band. For example, in a band in which communication between the eNB and the UE is not allowed and another wireless system is preferentially allowed in an LTE system, a method of determining whether communication of another wireless communication system which is preferentially allowed is present and performing LTE-based communication only when an incumbent user is not present may be considered. In this case, it is necessary to sense whether another wireless system is used in every subframe. In this case, as described in the examples of the present invention, carrier sensing may be performed in first several OFDM (or SC-FDMA) symbol intervals of a subframe and transmission from the eNB to the UE in an LTE system may be performed in the remaining region of the subframe. In addition, the examples of a subframe structure, a channel structure and transmit power control when UL resources or DL resources described in the examples of the present invention are allocated for communication between UEs are applicable to communication between an eNB and a UE in an unlicensed band. Thus, it is possible to mitigate/eliminate interference of communication between an eNB and a UE with communication of another system and avoid/eliminate interference from communication of another system.

Figure 23:
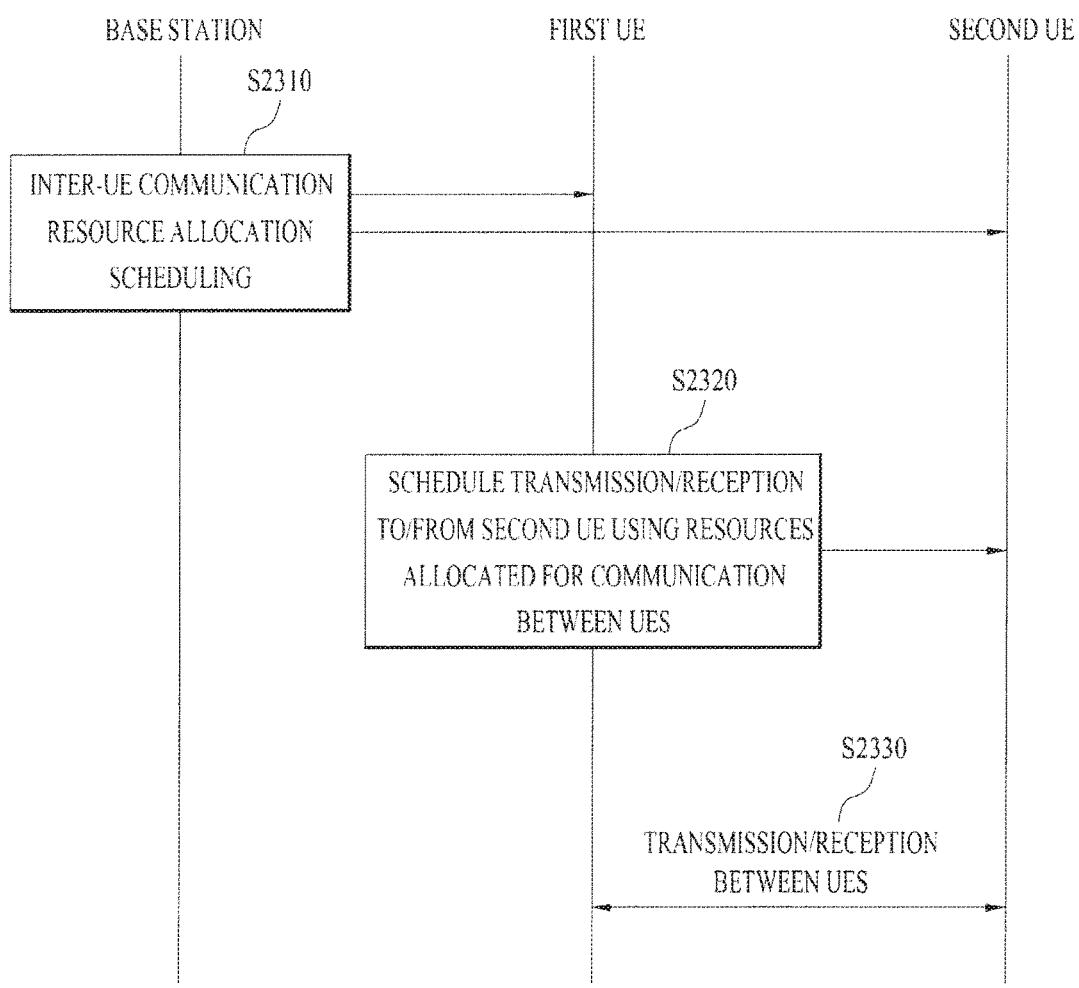
FIG. 23 is a flowchart of a method for communication between UEs according to an embodiment of the present invention.

FIG. 23 is a flowchart of a method for communication between UEs according to an embodiment of the present invention.

In step S2310, an eNB may allocate resources for communication between UEs (communication between a first UE and a second UE) and transmit scheduling information including power control information to the first UE and/or the second UE along with such resource allocation information.

In step S2320, the first UE may schedule communication between the first UE and the second UE using resources allocated by the eNB for communication between UEs and inform the second UE of such scheduling information. The first slot of the subframe among resources for communication between UEs may include a control signal for communication between UEs and the second slot may include a data signal between the UEs.

In step S2320, the first and second UE may perform communication between UEs based on scheduling information of step S2320.

In FIG. 23, the first UE may correspond to a primary UE and the second UE may correspond to a secondary UE.

In the method for communication between UEs according to an example of the present invention described with reference to FIG. 23, details of the above described various embodiments of the present invention may be independently applied or 2 or more embodiments may be applied at the same time. In this case, overlapping details will be omitted for the description for simplicity and clarity. The method for communication between UEs according to an example of the present invention described with reference to FIG. 23 is applicable to communication between an eNB and a UE for reducing interference with another system or another cell. In this case, the operation of the first UE may be regarded as the operation of the eNB and the operation of the second UE may be regarded as the operation of the UE communicating with the eNB.

Figure 24:
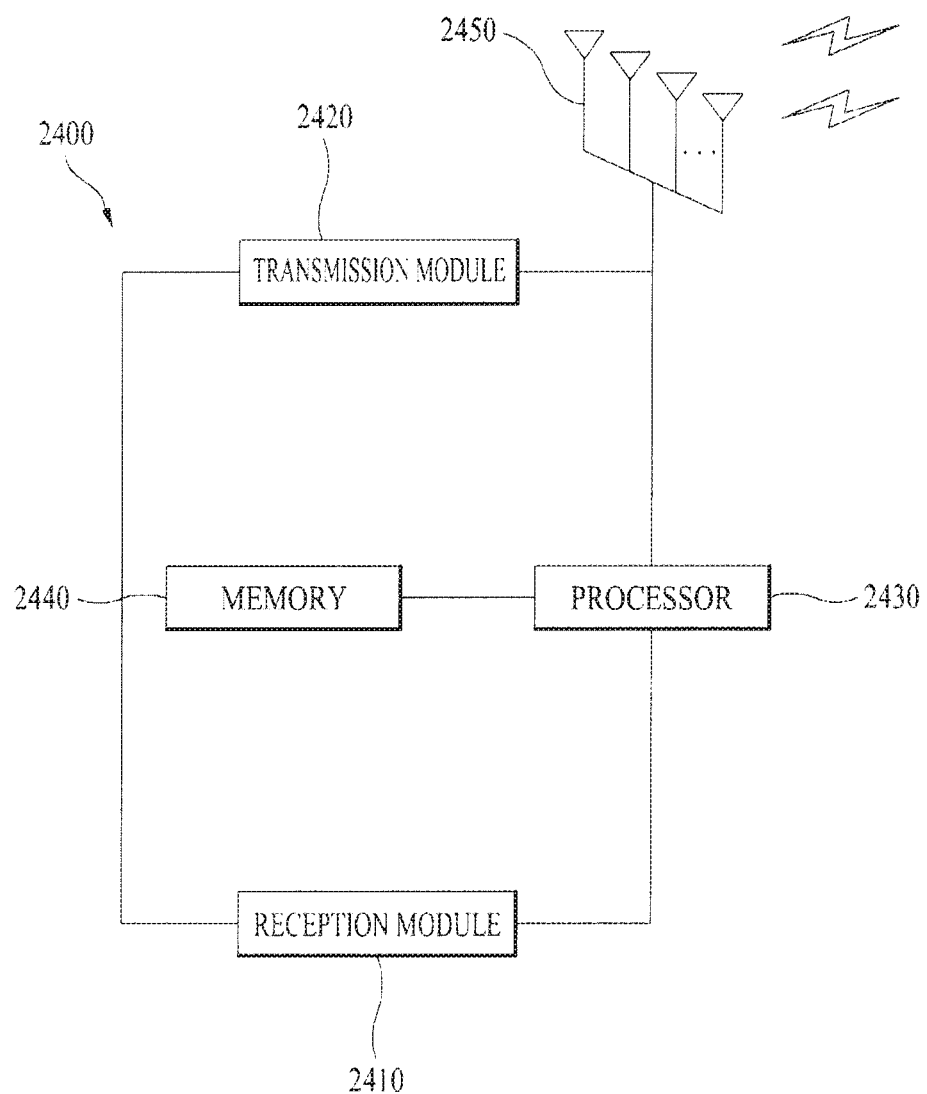
FIG. 24 is a diagram showing the configuration of a transmission/reception device according to the present invention.

FIG. 24 is a diagram showing the configuration of a transmission/reception device according to the present invention.

The transmission/reception device 2400 of FIG. 24 may be a user equipment device, for example. The user equipment device 2400 according to the present invention may include a reception module 2410, a transmission module 2420, a processor 2430, a memory 2440, and a plurality of antennas 2430. The plurality of antennas 2450 indicates that the user equipment device supports MIMO transmission and reception. The reception module 2410 may receive various signals, data, and information on a downlink from the base station. The transmission module 2420 may transmit various signals, data, and information on an uplink to the base station. The processor 2430 may control the overall operations of the user equipment device 2400.

The user equipment device 2400 according to the embodiment of the present invention may be configured to perform inter-UE communication with another UE device. The processor 2430 of the user equipment device 2400 may be configured to receive scheduling information including information for allocating resources for communication between UEs from the eNB. The processor 2430 may be configured to perform communication with the other UE via one or more of the transmission module 2410 or the reception module 2420 based on the scheduling information. The first slot of the subframe among resources for communication between UEs may include a control signal for communication between the UEs and the second slot of the subframe may include a data signal between the UEs.

Moreover, the processor 2430 of the user equipment device 2400 performs a calculation/operation process on information received by the use equipment device 2400, information that is to be transmitted outside, and so on. The memory 2440 may store the processed information for a predetermined period of time, and the memory 2440 may be replaced by another element, such as a buffer (not shown).

In the above-described detailed configuration of the base station device and the user equipment device, details of the above-described various embodiments of the present invention may be independently applied or 2 or more embodiments may be applied at the same time. In this case, overlapping details will be omitted from the description for simplicity and clarity.

Furthermore, the above description of the present invention may also be equally applied to a relay station device functioning as a downlink transmission subject or an uplink reception subject. The description of the user equipment device may also be equally applied to a relay station device functioning as an uplink transmission subject or a downlink reception subject.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), is programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention are applicable to various mobile communication systems.

The invention claimed is:

1. A method of performing communication between a first UE (User Equipment) and a second UE in a wireless communication system, the method performed by the first UE and comprising:
being configured, by a higher layer, to use a first identifier which is different from a second identifier for a communication between the first UE and the base station to receive, from a base station, downlink control information comprising scheduling information for a communication between the first UE and the second UE;
receiving, from the base station, the downlink control information;
decoding the downlink control information using the first identifier; and
performing the communication between the first UE and the second UE based on the scheduling information.

2. The method according to claim 1, wherein the downlink control information includes a Cyclic Redundancy Check (CRC) scrambled by the first identifier.

3. The method according to claim 1, wherein the scheduling information includes resource information used for the communication between the first UE and the second UE.

4. The method according to claim 1, wherein the scheduling information includes a Transmission Power Control (TPC) command for the communication between the first UE and the second UE.

5. The method according to claim 1, wherein the communication between the first UE and the second UE is performed in a subframe which does not overlap in time with an uplink transmission from the first UE to the base station.

6. A first User Equipment (UE) performing a communication with a second UE in a wireless communication system, the first UE comprising:
- a transmitter;
- a receiver; and
- a processor that controls the first UE,
- wherein the first UE is configured, by a higher layer, to use a first identifier which is different from a second identifier for a communication between the first UE and the base station to receive, downlink control information comprising scheduling information for a communication between the first UE and the second UE, and
- wherein the processor receives, from the base station, the downlink control information, decodes the downlink control information using the first identifier, and performs the communication between the first UE and the second UE based on the scheduling information.

7. The method according to claim 6, wherein the downlink control information includes a Cyclic Redundancy Check (CRC) scrambled by the first identifier.

8. The method according to claim 6, wherein the scheduling information includes resource information used for the communication between the first UE and the second UE.

9. The method according to claim 6, wherein the scheduling information includes a Transmission Power Control (TPC) command for the communication between the first UE and the second UE.

10. The method according to claim 6, wherein the communication between the first UE and the second UE is performed in a subframe which does not overlap in time with an uplink transmission from the first UE to the base station.

* * * * *